US010952273B2

(12) United States Patent
Akoum et al.

(10) Patent No.: US 10,952,273 B2
(45) Date of Patent: Mar. 16, 2021

(54) DETECTING AND CORRECTING RADIO LINK FAILURES BASED ON DIFFERENT USAGE SCENARIOS

(71) Applicant: AT&T Intellectual Property I, L.P., Atlanta, GA (US)

(72) Inventors: Salam Akoum, Austin, TX (US); Ralf Bendlin, Cedar Park, TX (US); Xiaoyi Wang, Austin, TX (US); Thomas Novlan, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 29 days.

(21) Appl. No.: 15/674,488

(22) Filed: Aug. 10, 2017

(65) Prior Publication Data
US 2019/0053293 A1 Feb. 14, 2019

(51) Int. Cl.
*H04L 5/00* (2006.01)
*H04W 76/19* (2018.01)
(Continued)

(52) U.S. Cl.
CPC .......... *H04W 76/19* (2018.02); *H04W 24/04* (2013.01); *H04W 24/10* (2013.01); *H04W 72/042* (2013.01); *H04W 24/08* (2013.01)

(58) Field of Classification Search
CPC .............................. H04W 76/19; H04W 24/04
See application file for complete search history.

(56) References Cited

U.S. PATENT DOCUMENTS 6,915,477 B2    7/2005   Gollamudi et al.
7,359,327 B2    4/2008   Oshiba
(Continued)

FOREIGN PATENT DOCUMENTS

EP       1083708 B1     8/2007
KR    20080102817 A    11/2008
(Continued)

OTHER PUBLICATIONS

Sulieman, et al., "Link Failure Recovery via Diversity Coding in 5G Fronthaul Wireless Networks," IEEE 18th Wireless and Microwave Technology Conference (WAMICON), Apr. 2017, 4 pages.
(Continued)

*Primary Examiner* — Parth Patel
(74) *Attorney, Agent, or Firm* — Amin, Turocy & Watson, LLP

(57) ABSTRACT

The disclosed subject matter provides techniques for detecting and correcting radio link failures based on the different usage scenarios. In one embodiment, a device is provided that comprises a processor, and a memory that stores executable instructions that, when executed by the processor, facilitate performance of various operations. These operations can comprise monitoring a quality of a radio link established between the device and a network device of a wireless communication network based on downlink transmissions received from the network device. These operations can further comprise determining whether the quality indicates the device and the network device are out-of-sync based on the quality being below a defined quality level, wherein the defined quality level varies based on a usage scenario associated with usage of the radio link by the device.

20 Claims, 11 Drawing Sheets

(51) Int. Cl.
*H04W 24/04* (2009.01)
*H04W 24/10* (2009.01)
*H04W 72/04* (2009.01)
*H04W 24/08* (2009.01)

(56) References Cited

U.S. PATENT DOCUMENTS

| | | |
|---|---|---|
| 7,583,968 B2 | 9/2009 | Kimura |
| 8,340,580 B1 | 12/2012 | Epstein |
| 8,654,653 B2 | 2/2014 | Bae |
| 8,730,921 B2 | 5/2014 | Al-khudairi et al. |
| 8,929,202 B2 | 1/2015 | Wahlqvist et al. |
| 8,954,056 B2 | 2/2015 | Shimizu |
| 9,055,497 B2 | 6/2015 | Koo et al. |
| 9,094,858 B2 | 7/2015 | Burbidge et al. |
| 9,414,430 B2 | 8/2016 | Vajapeyam et al. |
| 9,717,075 B2 | 7/2017 | Koo et al. |
| 10,129,902 B2 * | 11/2018 | Kaur ................ H04W 72/121 |
| 10,194,402 B2 * | 1/2019 | Balachandran ....... H04W 76/18 |
| 2008/0171550 A1 * | 7/2008 | Zhao ................ H04W 74/02 455/445 |
| 2011/0194630 A1 | 8/2011 | Yang et al. |
| 2012/0236717 A1 * | 9/2012 | Saska ................ H04W 48/02 370/235 |
| 2012/0307621 A1 * | 12/2012 | Zawaideh ............ H04W 76/19 370/216 |
| 2013/0039287 A1 * | 2/2013 | Rayavarapu ........ H04W 68/005 370/329 |
| 2013/0324114 A1 | 12/2013 | Raghothaman et al. |
| 2014/0004888 A1 * | 1/2014 | Ando ................ H04W 24/08 455/456.6 |
| 2014/0056243 A1 * | 2/2014 | Pelletier ............... H04W 74/04 370/329 |
| 2014/0064124 A1 * | 3/2014 | Paladugu ............. H04W 76/19 370/252 |
| 2014/0080468 A1 | 3/2014 | Zhang et al. |
| 2016/0044518 A1 | 2/2016 | Centonza et al. |
| 2016/0127918 A1 * | 5/2016 | Yi ........................ H04W 16/26 370/329 |
| 2016/0135247 A1 * | 5/2016 | Ozturk .............. H04W 52/0212 455/436 |
| 2016/0150450 A1 * | 5/2016 | Balasubramanian ....................... H04W 48/18 370/331 |
| 2016/0302127 A1 | 10/2016 | Moon et al. |
| 2016/0360349 A1 * | 12/2016 | Goto ................ H04W 48/16 |
| 2017/0142741 A1 * | 5/2017 | Kaur ................ H04W 56/002 |
| 2017/0181154 A1 | 6/2017 | Zhou et al. |
| 2017/0201943 A1 | 7/2017 | Hsu et al. |
| 2017/0230780 A1 | 8/2017 | Chincholi et al. |
| 2017/0331577 A1 * | 11/2017 | Parkvall ............. H04J 11/0079 |
| 2017/0366236 A1 * | 12/2017 | Ryoo ................ H04B 7/0421 |
| 2018/0017973 A1 * | 1/2018 | Teague ............... B64C 39/024 |
| 2018/0035332 A1 * | 2/2018 | Agiwal ................ H04J 11/003 |
| 2018/0049053 A1 * | 2/2018 | Kaikkonen .......... H04W 24/08 |
| 2018/0054800 A1 * | 2/2018 | Yeo ................ H04W 76/15 |
| 2018/0063865 A1 * | 3/2018 | Islam ................ H04W 76/27 |
| 2018/0070341 A1 * | 3/2018 | Islam ................ H04L 1/1887 |
| 2018/0110082 A1 * | 4/2018 | Saily ................ H04W 76/25 |
| 2018/0184443 A1 * | 6/2018 | Li ................ H04W 72/1247 |
| 2018/0192436 A1 * | 7/2018 | Yi ........................ H04W 72/14 |
| 2018/0220344 A1 * | 8/2018 | Shaheen ................ H04W 4/60 |
| 2018/0242282 A1 * | 8/2018 | Li ........................ H04W 72/02 |
| 2018/0255532 A1 * | 9/2018 | Li ................ H04W 72/042 |
| 2018/0262289 A1 * | 9/2018 | Li ........................ H04J 11/005 |
| 2018/0270799 A1 * | 9/2018 | Noh ................ H04L 5/0094 |
| 2018/0278310 A1 * | 9/2018 | Lee ................ H04L 5/0053 |
| 2018/0279289 A1 * | 9/2018 | Islam ................ H04L 5/0094 |
| 2018/0279360 A1 * | 9/2018 | Park ................ H04W 72/14 |
| 2018/0287762 A1 * | 10/2018 | Sun ................ H04L 5/0005 |
| 2018/0288740 A1 * | 10/2018 | Ansari ................ H04W 76/36 |
| 2018/0294911 A1 * | 10/2018 | Sun ................ H04L 5/0053 |
| 2018/0295651 A1 * | 10/2018 | Cao ................ H04W 76/27 |
| 2018/0302889 A1 * | 10/2018 | Guo ................ H04W 72/046 |
| 2018/0316395 A1 * | 11/2018 | Sundararajan ....... H04B 7/0413 |
| 2018/0316412 A1 * | 11/2018 | Senior ................ H04B 7/15514 |
| 2018/0338253 A1 * | 11/2018 | Nagaraja ................ H04L 5/001 |
| 2018/0343154 A1 * | 11/2018 | Park ................ H04L 27/2613 |
| 2018/0352601 A1 * | 12/2018 | Park ................ H04W 76/19 |
| 2018/0368116 A1 * | 12/2018 | Liao ................ H04W 76/27 |
| 2019/0020506 A1 * | 1/2019 | Cheng ................ H04L 5/0053 |
| 2019/0021119 A1 * | 1/2019 | Ng ................ H04W 74/0833 |
| 2019/0028174 A1 * | 1/2019 | Chakraborty ......... H04W 76/18 |
| 2019/0044649 A1 * | 2/2019 | Kim ................ H04L 5/0044 |
| 2019/0053029 A1 * | 2/2019 | Agiwal ................ H04W 76/28 |
| 2019/0058517 A1 * | 2/2019 | Kang ................ H04B 7/06 |
| 2019/0058519 A1 * | 2/2019 | Davydov ............ H04B 7/0695 |
| 2019/0089579 A1 * | 3/2019 | Sang ................ H04W 40/36 |
| 2019/0182884 A1 * | 6/2019 | Deenoo ................ H04W 76/18 |
| 2019/0200249 A1 * | 6/2019 | Yoon ................ H04W 24/08 |
| 2019/0200345 A1 * | 6/2019 | Zhang ................ H04L 5/0094 |
| 2019/0306737 A1 * | 10/2019 | Kwak ................ H04W 24/08 |
| 2020/0008216 A1 * | 1/2020 | Iyer ................ H04W 72/1242 |
| 2020/0059404 A1 * | 2/2020 | Liu ................ H04W 76/27 |
| 2020/0213837 A1 * | 7/2020 | Pan ................ H04L 1/0038 |

FOREIGN PATENT DOCUMENTS

| | | |
|---|---|---|
| WO | 2014077766 A1 | 5/2014 |
| WO | 2015027381 A1 | 3/2015 |
| WO | 2016198098 A1 | 12/2016 |
| WO | 2017012299 A1 | 1/2017 |
| WO | 2017023370 A1 | 2/2017 |
| WO | 2017086845 A1 | 5/2017 |
| WO | 2017138978 A1 | 8/2017 |
| WO | 2018082521 A1 | 5/2018 |

OTHER PUBLICATIONS

Interdigital Inc., "RLM/RLF for NR," 3GPP Draft; R2-1706691 (R15 NR WI AI1029 RLM), 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27-29, 2017 Jun. 26, 2017 (Jun. 26, 2017), XP051301191, Retrieved from the Internet: URL:http://www.3gpp.org/ftp/Meetings_3GPP_SYNC/RAN2/Docs/ [retrieved on Jun. 26, 2017] sections 1-3.

Huawei, et al., "Initial RLM consideration for NR," 3GPP Draft; R4-1703679 Initial RLM Consideration for NR, 3rd Generation Partnership Project (3GPP), Mobile Competence Centre; 650, Route Des Lucioles; F-06921 Sophia-Antipolis Cedex; France, vol. RAN WG4, No. Spokane, USA; Apr. 3-7, 2017, Apr. 3, 2017 (Apr. 3, 2017), XP051246833, Retrieved from the Internet: URL:http://www.3gpp.org/ftp/Meetings_3GPP_SYNC/RAN4/Docs/ [retrieved on Apr. 3, 2017] sections 1.-3.

International Search Report and Written Opinion for International Application Serial No. PCT/US2018/045495 dated Oct. 30, 2018, 19 pages.

International Preliminary Report on Patentability for International Application No. PCT/US2018/045495 dated Feb. 20, 2020, 12 pages.

* cited by examiner

DETECTING AND CORRECTING RADIO LINK FAILURES BASED ON DIFFERENT USAGE SCENARIOS

TECHNICAL FIELD

The disclosed subject matter relates to advanced wireless communications systems that facilitate different usage scenarios, and more particularly to techniques for detecting and correcting radio link failures based on the different usage scenarios.

BACKGROUND

Under the umbrella of third generation partnership project (3GPP) wireless communication technology standards, radio-access technologies for mobile broadband have evolved effectively to provide connectivity to billions of subscribers and devices. Within this ecosystem, radio technology is evolving to cater to different usage scenarios. For example, 3GPP is currently defining a new standard referred to as New Radio (NR) that caters to three families of usage scenarios defined by the International Mobile Telecommunication system (IMT) 2020. These usage scenarios include enhanced Mobile Broadband (eMBB), Ultra Reliable and Low Latency Communications (URLLC), and massive Machine Type Communications (mMTC). Each of these usage scenarios are associated with different deployment contexts and configurations, including different carrier frequencies, different aggregated system bandwidths, different user equipment (UE) distributions, different service profiles, and the like. For example, unlike eMBB scenarios that have a relatively relaxed latency and reliability requirements, URLLC traffic has stringent latency (e.g., 0.5 milliseconds (ms) on the user plane for uplink and downlink), and reliability requirements. As a result, each of the different usage scenarios being developed for NR and beyond can respectively be associated with different quality of service requirement. However, existing techniques for radio link monitoring (RLM) do not accommodate these different usage scenarios.

BRIEF DESCRIPTION OF DRAWINGS

FIG. 8 illustrates another example method for detecting radio link failures based on different usage scenarios in accordance with various aspects and embodiments of the subject disclosure in.

DETAILED DESCRIPTION

Figure 1:
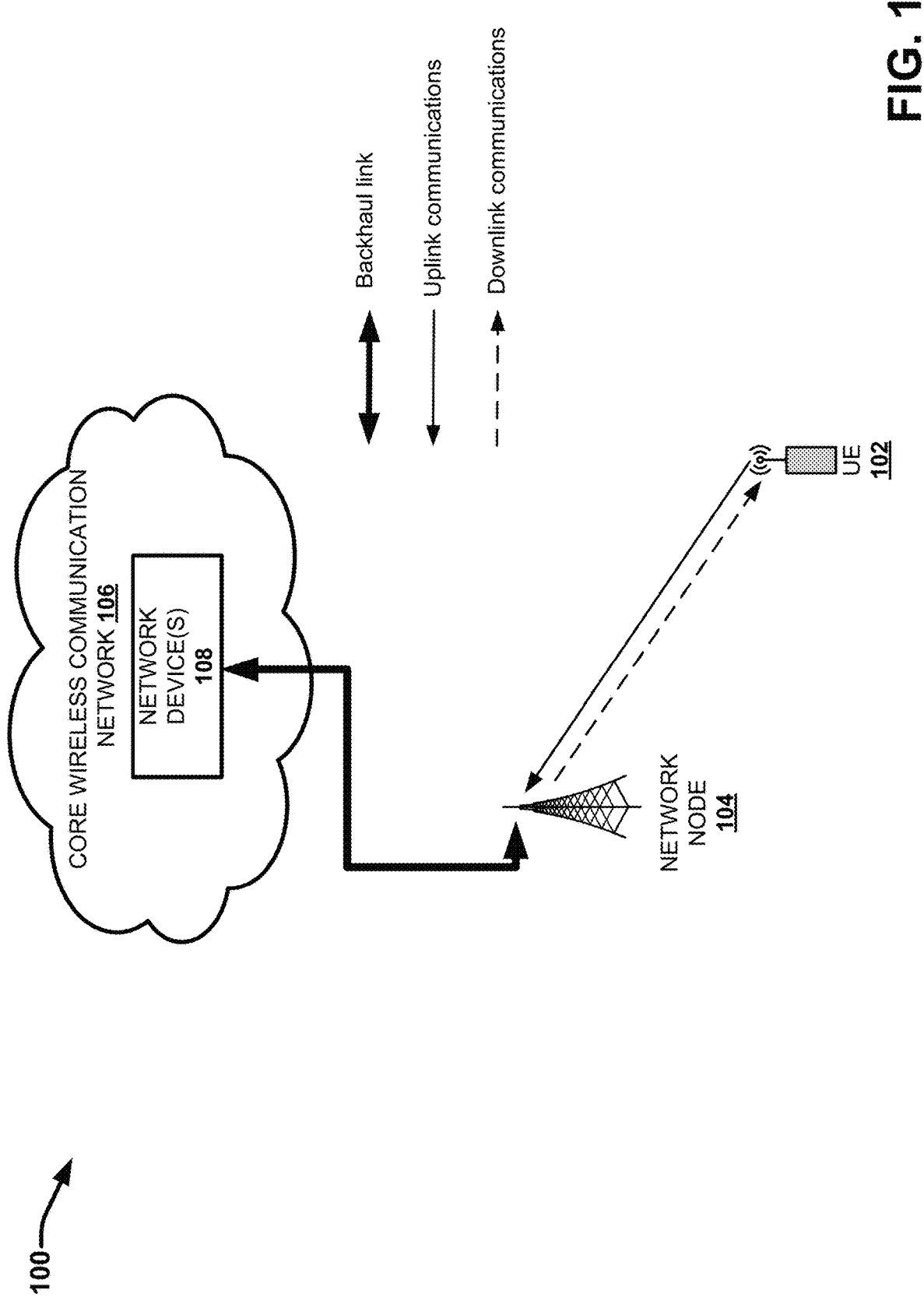
FIG. 1 is an illustration of an example wireless communication system that facilitates detecting and correcting radio link failures based on different usage scenarios in accordance with various aspects and embodiments of the subject disclosure.

The conventional RLM function at the UE monitors the downlink radio link quality of the serving cell when in the RRC connected mode. This enables the UE to determine whether it is in synchronization (in-sync) or out of synchronization (out-of-sync) with respect to its serving cell. When a number of consecutive out-of-sync indications are detected, the UE starts a network-configured RLF timer. The RLF timer can be stopped if a number of consecutive in-sync indications are reported by the UE. If the timer expires, RLF is declared. When RLF occurs, the UE can turn off its transmitter to avoid interference and proceeds to attempt to re-establish its RRC connection with the serving cell within a given duration of time or within a defined delay period. If the UE fails to re-establish the RRC connection within the defined delay period, the UE can be configured to go into an RRC idle state.

The conventional RLM, RLF and RRC do not take into account the quality of service requirements of the different usage scenarios that are being developed and implemented for NR standards. For example, URLLC traffic has key performance metrics for latency and reliability that makes it difficult and inappropriate to apply the same in-sync and out-of-sync detection parameters used for other types of traffic associated with more relaxed performance metrics (e.g., eMBB traffic).

The disclosed subject matter provides techniques for tailoring the RLM, RLF, and RRC connection re-establishment procedures at the UE based on a particular usage scenario associated with the radio link established between the UE and the servicing cell network device (e.g., the base station (BS), or the like). In this regard, the particular usage scenario (e.g., eMBB, URLLC, mMTC, and other possible existing and future usage scenarios) can correspond to a particular type of traffic and the associated quality of service requirement(s) for the particular type of traffic. Accordingly, the RLM, RLF and RRC connection re-establishment procedures at the UE can be tailored to be either more or less stringent based on the quality of service requirements of the current usage scenario for the current RRC connection or radio link.

For example, in various embodiments, the UE can be configured to monitor the downlink radio link quality of the serving cell when in RRC connected mode to determine whether the UE is in-sync or out-of-sync with respect to its serving cell and to further determine when to declare RLF. However, the UE's evaluation of the monitored downlink radio link quality can be tailored based on the quality of service requirement of the current usage scenario. In this regard, one or more parameters respectively used to by the UE to evaluate the radio link quality in association with the RLM and RLF procedures can vary based the current usage scenario. For example, the particular number of consecutive out-of-sync indications detected by the UE that cause the UE to initiate the RLF timer can vary for different usage scenarios. In another example, the duration of the RLF timer can vary for the different usage scenarios. In another example, the manner in which the UE calculates measurement representatives of the radio link quality can vary for the different usage scenarios. In another example, the particular threshold values that are used to determine whether a UE determined radio link quality measurement should be considered an out-of-sync indication or an in-sync indication can vary for the different usage scenarios. Accordingly, in one example implementation, in a usage scenario that involves communication of a low latency and high reliability type traffic (e.g., URLLC) via a radio link established between a UE and a network device, the UE can be required to maintain a higher radio link quality level relative to a usage scenario that involves a higher latency lower reliability type traffic (e.g., eMBB). In this regard, the UE can be configured to withstand a lower radio link quality level for the low reliability type traffic relative to the radio quality link level for the high reliability type traffic before determining the UE is out-of-sync with the serving cell and declaring a RLF.

Similarly, with respect to the RRC connection re-establishment procedure, the UE can be configured to apply different requirements associated with performance of the RRC connection re-establishment procedure based on different usage scenarios associated with a failed radio link between the UE and its server network device. For example, in some embodiments, the UE can be configured to apply different requirements associated with the timing of performance of one or more aspects of the RRC connection re-establishment procedure (e.g., the RRC connection period duration, a time period allotted for identifying the UE's serving cell, and the like). The UE can also be configured to apply different resource requirements for one or more aspects of the RRC connection re-establishment procedure based on the different usage scenarios and the different quality of service requirements respectively associated with the different usage scenarios.

In various embodiments, the different usage scenarios can respectively correspond to different control resource set (CORESET) groups. According to these embodiments, the UE can be configured to differentiate between RLM, RLF and RRC connection re-establishment events for the different CORESET groups. In this regard, the parameters/requirements respectively associated with the RLM/RLF and RRC connection re-establishment procedures can be defined differently depending on the quality of service requirements of the usage scenarios that respectively correspond to the different CORSET groups.

A control channel resource set (CORESET) is defined as a set of resource element groups (REGs) within which a UE attempts to blindly decode downlink control information. A UE can employ one or more control channel resource sets (CORESETs). Each CORESET is associated with a search space, and the search space includes aggregation level(s) and the number of decoding candidates for each aggregation level. The time/frequency resource containing at least one search space is obtained by the UE from the master information block (MIB)/system information/implicitly derived from initial access information. The time/frequency resource containing additional search spaces can be provided to the UE by the network device using dedicated RRC signaling. A search space in NR is associated with a single CORESET. The search spaces in different CORESET are defined independently.

The difference in the quality of service requirements for different usage scenarios have prompted the need for configurable group formations of CORESETs depending on the quality of service of the traffic envisioned. Such configurable groupings of CORESETs are referred to herein as "CORESET groups". A "CORESET group" refers to a plurality of CORESETs that can be grouped together and associated with a particular quality of service requirement, set of quality of service requirements, and/or a particular a particular type of traffic/usage scenario (e.g., eMBB, URLLC, mMTC). In this regard, a CORESET group can be defined based on the quality of service requirements of the traffic served by the corresponding downlink control information. Such a grouping of CORESETs is important for various applications of NR, to cater to different traffic needs and differentiate between control plane and user plane procedures corresponding to different quality of service requirements. In accordance with one or more embodiments, a CORESET group is a group of CORESETs that can be employed by a UE to decode the downlink control information (DCI) corresponding to a particular usage scenario/traffic type quality of service requirement.

For example, one CORESET group can be designed to correspond to either URLLC traffic, where the latency and reliability requirements are stringent, or eMBB type traffic, where the latency and reliability requirements are more relaxed, but higher data rates are required. Thus in various embodiments, the RLM/RLF and RRC connection re-establishment procedures employed by the UE in a given usage scenario can be varied based on the CORESET group employed by the UE to decode the DCI associated with the current usage scenario of the radio link. In this regard, the UE can be configured to monitor the downlink radio link quality of the serving cell when in the RRC connected mode, and make determinations regarding whether the UE is in-sync or out-of-sync with respect to its serving cell, declaring RLF, and triggering RRC connection re-establishment, based on the quality of service requirements that the CORESET group corresponds to.

In one or more embodiments, a device is provided (e.g., a UE) that comprises a processor, and a memory that stores executable instructions that, when executed by the processor, facilitate performance of various operations. These operations can comprise monitoring a quality of a radio link established between the device and a network device of a wireless communication network based on downlink transmissions received from the network device. These operations can further comprise determining whether the quality indicates the device and the network device are out-of-sync based on the quality being below a defined quality level, wherein the defined quality level varies based on a usage scenario associated with usage of the radio link by the device. In various implementations, the defined quality level can vary based on a quality of service requirement associated with the usage scenario, wherein the usage scenario is selected from different usage scenarios that are respectively associated with different quality of service requirements. In an aspect, the different usage scenarios are selected from a group comprising eMBB communications, URLLC, and mMTC. In another aspect, the defined quality level can vary based on a CORESET group associated with the usage scenario, and wherein the different usage scenarios are respectively associated with different CORESET groups.

In some implementations, the monitoring of the quality of the radio link comprises determining link quality measurements based on at least some of the downlink transmissions and a reference PDCCH transmission received from the network device, and wherein the reference PDCCH transmission varies based on the usage scenario. The PDCCH transmission can vary for different usage scenarios with respect to formatting of the DCI information or the like. In another implementation, at least some of the downlink transmissions comprise reference signals, wherein the monitoring the quality of the radio link comprises determining link quality measurements based on the reference signals, and wherein the reference signals can vary based on the usage scenario.

In various additional implementations, the monitoring of the quality of the radio link comprises determining link quality measurements based on at least some of the downlink transmissions, wherein the determining whether the quality indicates the device and the network device are out-of-sync is based on detection of a defined number of consecutive link quality measurements that are below a threshold value, and wherein the threshold value varies based on the usage scenario. The monitoring of the quality of the radio link can also comprise determining link quality measurements based on at least some of the downlink transmissions, wherein the determining whether the quality indicates the device and the network device are out-of-sync is based on detection of a defined number of consecutive link quality measurements that are below a threshold value, and wherein the defined number of consecutive link quality measurements varies based on the usage scenario.

In one or more embodiments, the operations can further comprise, based on a first determination that the quality of the radio link indicates the device and the network device are out-of-sync, continuing the monitoring of the quality of the radio link for a defined time period (e.g., the RLF timer period), wherein the defined time period varies based on the usage scenario. The operations can further comprise determining whether the quality indicates a failure of the radio link (e.g., a RLF) based on the quality remaining below the defined quality level for the defined time period. According to these embodiments, the process of continuing the monitoring of the quality of the radio link comprises determining link quality measurements based on at least some of the downlink transmissions, wherein the determining whether the quality indicates the failure of the radio link based is based on detection of a defined number of consecutive link quality measurements that are below a threshold value, and wherein the defined number of consecutive link quality measurements varies based on the usage scenario. The operations can further comprise disabling the radio link with the network device based on a second determination that the quality of the radio link indicates the failure of the radio link, and performing a connection re-establishment procedure to re-establish the radio link with the network device based on the disabling the radio link, and wherein the connection re-establishment procedure varies based on the usage scenario. In some implementations, the connection re-establishment procedure can vary with respect to a timer associated with performance of the connection re-establishment procedure and/or a configuration parameter associated with resources used for the connection re-establishment procedure.

In another embodiment, a method is provided that comprises monitoring, by a device comprising a processor, a quality of a radio link established between the device and a network device of based on downlink transmissions received from the network device. The method further comprises determining, by the device, whether the quality indicates the device and the network device are out-of-sync based on the quality being below a defined quality profile, wherein the defined quality profile is variable based on a CORESET group associated with traffic communicated between the device and the network device via the radio link. In one or more implementations, CORESET group associated with the traffic is selected from different CORESET groups based on a quality of service requirement associated with the traffic.

In yet another embodiment a machine-readable storage medium, comprising executable instructions that, when executed by a processor of a device, facilitate performance of operations. These operations can include deactivating a radio link established between the device and a network device of a wireless communication network based on a determination that the radio link has failed. These operations can further include performing a connection re-establishment procedure to re-establish the radio link with the network device based on the terminating the radio link, wherein the connection re-establishment procedure varies based on a control channel resource set group associated with traffic communicated between the device and the network device via the radio link. In some implementations, the connection re-establishment procedure comprises sending a L2/L3 message comprising a connection request to the network device and information identifying a reason for the deactivating the radio link based on the control channel resource set group. This reason can be variable depending on the CORESET group associated with the usage scenario. This reason can also include an inability of the device to successfully perform a beam failure recovery process.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

FIG. 1 is an illustration of an example wireless communication system 100 that facilitates detecting and correcting radio link failures based on different usage scenarios in accordance with various aspects and embodiments of the subject disclosure. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

The wireless communication system 100 can be or include various types of disparate networks, including but not limited to: cellular networks, femto networks, picocell networks, microcell networks, internet protocol (IP) networks Wi-Fi service networks, broadband service network, enterprise networks, cloud based networks, and the like. Wireless communication system 100 can comprise one or more UEs 102, a network node 104 and a core wireless communication network 106. It should be appreciated that a single UE 102 is depicted for exemplary purposes and that any number of UEs can be included in wireless communication system 100. The UE 102 can include a variety of different mobile and stationary device types that can be configured to operate perform RLM, RLF, and RRC connection re-establishment procedures that vary based on different usage scenarios, traffic types, and/or quality of service requirements in accordance with various aspects and embodiments described herein. For example, the UE 102 can include but is not limited to: a cellular phone, a smartphone, a tablet computer, a wearable device, a virtual reality (VR) device, a heads-up display (HUD) device, and the like. In various exemplary embodiments, the UE 102 can be configured to operate using one or more usage scenarios that are attributed to different traffic types, quality of service requirements, and/or CORSET groups. For example, the UE 102 can be configured to communicate in accordance with eMBB communication standards, URLLC standards, mMTC standards, and other possible communication standards that tailor to different traffic types and/or quality of service requirements. It should be appreciated that the eMBB communication standards, URLLC standards, and the mMTC standards are merely exemplary and not intended to limit the concepts of the subject disclosure.

The UE 102 can be configured to communicate with the core wireless communication network 106, and more particularly one or more network devices 108 of the core wireless communication network 106, using a communication link established between the UE 102 and a network node 104 of the wireless communication network. The network node 104 can be connected to the core wireless communication network 106 (or one or more network devices of the core wireless communication network 106) via one or more backhaul links (indicated by the thick arrow line). For example, the one or more backhaul links can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation). The thin solid arrow line from the UE 102 to the network node 104 represents uplink communications and the thin dashed arrow line from the network node 104 to the UE 102 represents downlink communications.

The non-limiting term network node (or radio network node) is used herein to refer to any type of network node serving a UE 102 and/or connected to other network node, network element, or another network node from which the UE 102 can receive a radio signal. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission nodes, an RRU, an RRH, nodes in distributed antenna system (DAS), and the like.

The wireless communication system 100 can employ various wireless communication technologies and modulation schemes to facilitate wireless radio communications between devices (e.g., between UEs 102 and between UEs 102 and the network node 104, between the network node 104 and one or more network devices 108, etc.). For example, the UEs 102 can be configured to communicate with the network node 104, and vice versa using various wireless communication technologies, including but not limited to: Universal Mobile Telecommunications System (UMTS) technologies, LTE technologies, advanced LTE technologies (including voice over LTE or VoLTE), narrowband IoT (NB-IoT), Code Division Multiple Access (CDMA) technologies, Time Division Multiple Access (TDMA) technologies, Orthogonal Frequency Division Multiplexing (OFDN) technologies, Filter Bank Multicarrier (FBMC) technologies, Wireless Fidelity (Wi-Fi) technologies, Worldwide Interoperability for Microwave Access (WiMAX) technologies, General Packet Radio Service (GPRS) technologies, Enhanced GPRS, technologies, Third Generation Partnership Project (3GPP) technologies, Fourth Generation Partnership Project (4GPP) technologies, Fifth Generation Partnership Project (5GPP) technologies, Ultra Mobile Broadband (UMB) technologies, High Speed Packet Access (HSPA) technologies, Evolved High Speed Packet Access (HSPA+), High-Speed Downlink Packet Access (HSDPA) technologies, High-Speed Uplink Packet Access (HSUPA) technologies, ZIGBEE® technologies, or another IEEE 802.XX technology. Additionally, substantially all aspects disclosed herein can be exploited in legacy telecommunication technologies.

The core wireless communication network 106 can include various network devices 108 that facilitate providing wireless communication services to the UEs 102 via the network node 104 and/or various additional network devices (not shown). For example, the one or more network devices 108 of the core wireless communication network 106 can include but are not limited to: mobile switching center (MSCs) devices, a home location register (HLR) device, a visitor location register (VLR) device, authentication center (AUC) devices, provisioning servers, billing servers, operation and support system (OSS) devices, short message service center (SMSC) devices, and many other elements. In some implementations, the one or more network devices 108 includes a mobility management entity (MME) device. For example, the system architecture evolution (SAE) is the core network architecture of 3GPP's LTE wireless communication standard. In accordance with SAE, the MME is the key control-node for the LTE access-network. The MME is involved in the bearer activation/deactivation process and is also responsible for choosing the serving gateway (SGW) for a UE at the initial attach, the TAU procedure, and at time of intra-LTE handover involving core network (CN) node relocation. The MME is also responsible for idle mode UE paging and tagging procedure including retransmissions.

In accordance with various aspects and embodiments described herein, wireless communication system 100 can be configured to facilitate detecting and correcting radio link failures based on different usage scenarios in association with a wireless radio link established between the UE 102 and the network node 104. In particular, the UE 102 and the network node 104 of wireless communication system 100 can be configured to employ RLM, RLF and RRC connection re-establishment procedures that are specifically tailored to the different quality of service requirements associated with the different usage scenarios. These different usage scenarios can correspond to for example, a different traffic types and/or different CORESET groups.

Figure 2:
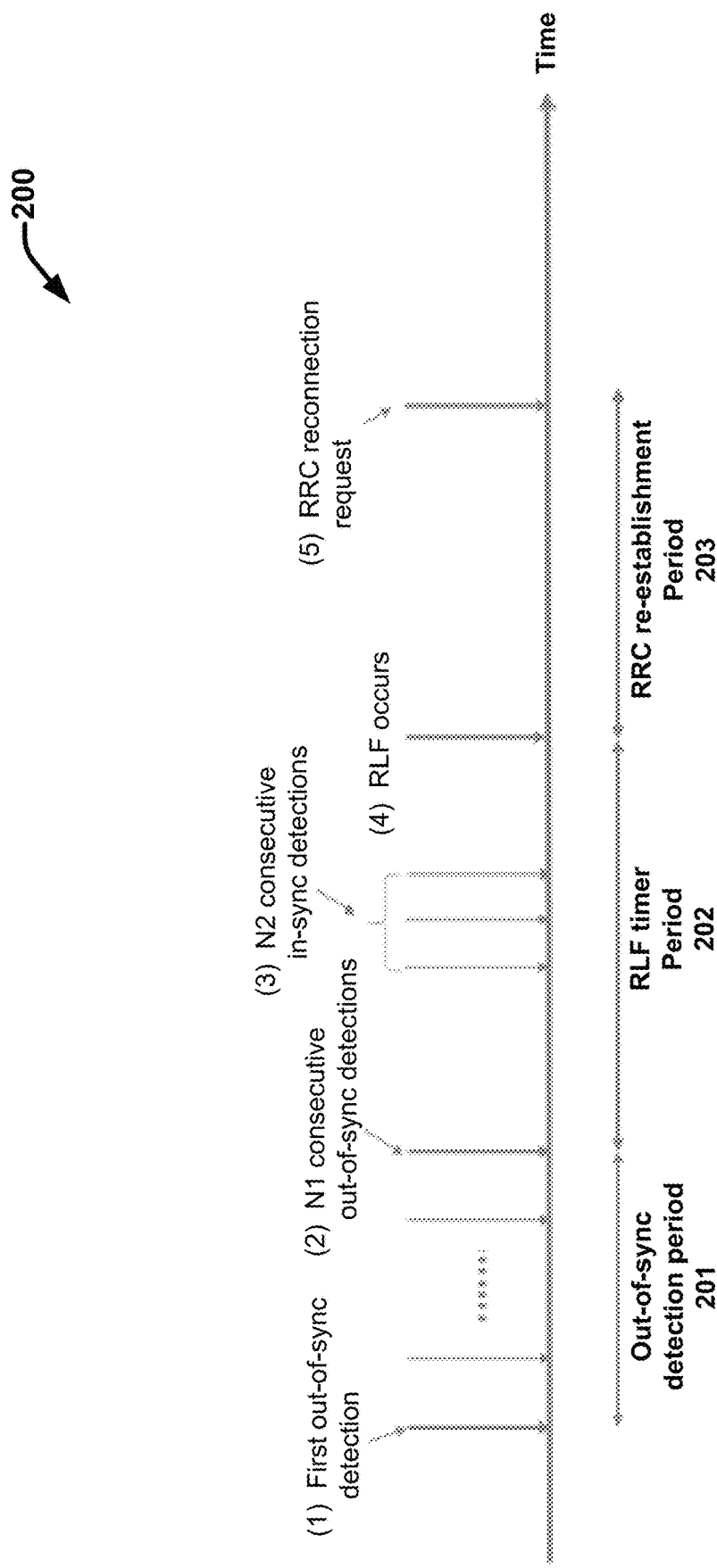
FIG. 2 provides a diagram demonstrating principles of radio link monitoring (RLM), radio link failure (RFL) detection, and radio resource control (RRC) connection re-establishment in accordance with various aspects and embodiments of the subject disclosure.

FIG. 2 provides a diagram 200 demonstrating example principles of RLM, RLF detection, and RRC connection re-establishment in accordance with various aspects and embodiments of the subject disclosure. In accordance with various embodiments, when a UE (e.g., UE 102) has established a radio link with a network device (e.g., network node 104) or is otherwise in the RRC connected mode, the UE can be configured to perform RLM to monitor the downlink radio link quality. The RLM procedure generally involves two phases or periods, respectively represented in diagram 200 as the out-of-sync detection period 201 and the RLF timer period 202. If RLF is declared upon the expiration of the RLF timer period 202, the UE can be configured to initiate the RRC connection re-establishment procedure which can occur over another defined period represented in diagram 200 as the RRC re-establishment period 203.

With reference to FIGS. 1 and 2, in accordance with the RLM procedure, the UE 102 can be configured to monitor the downlink radio link quality of the radio link established between the UE 102 and the network node 104 based on downlink transmissions received from the network node 104. In this regard, the UE can be configured to determine, (either regularly, continuously, at defined time points, based on reception of particular downlink transmissions or groups of downlink transmissions, based on defined trigger events, etc.), radio link quality measurements representative of the UEs estimate of the downlink radio link quality based on one or more of the downlink transmissions. For example, in some embodiments, the downlink transmissions monitored can include reference signals transmitted by the network node 104 and the UE can be configured to determine the radio link quality measurements based on one or more of the reference signals. In some implementations, the downlink signals monitored/evaluated by the UE to determined the downlink radio quality link measurements can include other types of signals (e.g., actual physical downlink control channel (PDCCH) transmissions) transmitted to the UE by the network node 104.

In various implementations, the radio link quality measurements are expressed in terms of block error rate (BLER) of a hypothetical or reference PDCCH transmission from the network node 104. In particular, in accordance with various NR standards, the network node 104 provides the UE downlink control information via the PDCCH to convey scheduling decisions and various other types of control information (e.g., information regarding the CORESET groups to be employed by the UE). Accordingly, correct reception and decoding by the UE of the PDCCH transmissions is critical to the correct operation of the network. Thus in some implementations, the criteria for determining measures of the downlink quality that indicate out-of-sync and in-sync conditions can be based on whether the UE can reliably decode the PDCCH or not.

A number of different formats can be used for the transmission of the DCI on the PDCCH in order to adapt to variations in the quality of the transmission link between the network node 104 and the UE 102. These different formats correspond to different levels of error correction redundancy and hence have different signal to noise ratio (SNR) requirements. In various implementations, an indication that the UE 102 is out-of-sync with the network node 104 can be based on failure of the UE to reliably receive a first hypothetical PDCCH transmitted with a first format using a high level of redundancy. On the other hand, an indication that the UE is in-sync with the network node 104 can be based on an estimate that the UE can correctly receive DCI transmitted on the PDCCH with a second format using a low level of error correction redundancy. Accordingly, in some implementations, the BLER measurements determined by the UE 102 that are used to determine if the UE is in-sync and out-of-sync are based on received downlink transmissions from the network node (e.g., received reference signals) in view of these two hypothetical or reference PDCCH formats. For example, in some implementations, the UE 102 can determine BLER measurements representative of the estimated downlink channel quality based on the tone quality and/or signal strength of received reference signals in view of the parameters defined for the hypothetical/reference PDCCHs. However, in one or more alternative implementations, the UE 102 can determine the BLER measurements based on actual PDCCH transmissions received from the network node 104.

With reference to diagram 200, in various embodiments the out-of-sync detection period 201 begins when the UE 102 first determines one or more link quality measurements that indicate the UE is out-of-sync with the network node 104 with respect to a defined threshold link quality value. This initial out-of-sync detection is identified in diagram 200 at marker (1). In this regard, the UE can determine that is out-of-sync when a radio link quality measurement is worse than a threshold value, referred to as Qout. The UE can also determine that it is in-sync when a radio link quality measurement is better than another threshold value, referred to as Qin. The Qout value can thus reflect a link quality level at which the downlink radio link cannot be reliably received and the Qin value can reflect a link quality level at which the downlink radio link quality can be significantly more reliably received than at Qout. In various embodiments, these thresholds can be expressed in terms of the BLER of the hypothetical/reference PDCCH transmissions discussed above. For instance, in one example, the Qout value can correspond to a 10% BLER of a first hypothetical/reference PDCCH transmission taking into account the physical control format indicator channel (PCFICH) errors. The Qin value can correspond to a 2% BLER of second hypothetical/reference PDCCH transmission taking into account the PCFICH errors. Accordingly, in one or more embodiments, the UE can detect an out-of-sync indication based on measured BLER estimates that are greater than (or equal to) Qout. Likewise, the UE can detect an in-sync indication based on measured BLER estimates that are less than (or equal to) Qin.

After the UE detects an initial out-of-sync detection (e.g., as shown by marker (1) in diagram 200), the UE can be configured to continue to monitor the downlink channel quality by calculating subsequent channel link quality measurements (e.g., BLERs). If the UE detects a defined number (N1) of consecutive out-of-sync detections, the UE can then start the RLF timer, indicated in diagram 200 as marker (2). The RLF timer has a predefined duration (e.g., 20 ms, 20 frames, etc.) which controls the duration of the RLF timer period 202. The RLF timer can be stopped if a defined number of consecutive in-sync indications are measured by the UE. In the embodiment shown, a determination that the downlink radio link quality is above a certain threshold can be based on detection of another defined number (N2) of in-sync detections, shown in diagram 200 as marker (3). In this regard, if the UE detects a defined number (N2) of in-sync indications within the RLF timer period, the UE can stop the RLF timer, and restart the RLM cycle. However, if the downlink radio link quality remains below Qout for the duration of the RLF timer period 202, RLF is declared. According to this embodiment, upon expiration of the RLF timer period 202 without detecting another defined number on in-sync indications, the UE can declare RLF, as shown at marker (4).

When RLF occurs, the UE 102 can be configured to turn off its transmitter to avoid interference. In this regard, the UE 102 can effectively disable, deactivate or otherwise or otherwise terminate the current radio link. The UE 102 can further be configured to proceed to attempt to re-establish its RRC connection with the network node 104 within a given duration of time or delay period. For example, in the embodiment shown, the RRC re-establishment period 203 corresponds to the defined time delay within which the UE is required to provide an RRC reconnection request, shown in diagram at marker (5). If the UE fails to provide the RRC reconnection request and re-establish the RRC connection within the RRC re-establishment period 203, the UE can go into an RRC idle state.

The conventional RLM, RLF and RRC connection re-establishment procedures for LTE do not take into account the quality of service requirements of the different usage scenarios that are being developed and implemented for NR standards. For example, URLLC traffic has key performance metrics for latency and reliability that makes it difficult and inappropriate to apply the same in-sync and out-of-sync detection parameters used for other types of traffic associated with more relaxed performance metrics (e.g., eMBB traffic). In accordance with various embodiments, the UE 102 can be configured to tailor one or more aspects of the RLM, RLF, and RRC connection re-establishment procedures described with reference to diagram 200 based on the quality of service requirements associated with a particular usage scenario of the radio link established between the UE 102 and the network node 104. For example, as described supra, the different usage scenarios can respectively correspond to or otherwise be associated with different types of traffic (e.g., eMBB, URLLC, mMTC, etc.), different quality of service requirements, and/or different CORESET groups.

In various embodiments, the RLM, RLF and RRC connection re-establishment procedures can be tailored to different usage scenarios/traffic type and/or CORSET groups with respect to the parameters and/or procedural requirements respectively applied by the UE 102 to evaluate the radio link quality in association with the RLM and RLF procedures. In this regard one or more parameters and/or procedural requirements (e.g., the threshold values for Qout and Qin, N1, N2, the RLF timer, etc.) defined for the RLM and RLF procedures can vary based the current usage scenario/traffic type and/or CORESET group. In addition, one or parameters and/or procedural requirements associated with the RRC connection re-establishment procedure (e.g., the connection re-establishment duration timer) can be tailored to account for different usage scenarios.

The UE 102 can be provided with information defining the different parameters and/or procedural requirements associated with performing RLM, RLF and RRC connection re-establishment procedures in different usage scenarios. The UE can further apply the applicable parameters and/or procedural requirements based on the current usage scenario, traffic type, quality of service requirement, and/or CORESET group associated with a radio link between the UE 102 and the network node 104. The information defining the different parameters and/or procedural requirements associated with performing RLM, RLF and RRC connection re-establishment procedures by the UE in different usage scenarios is generally referred to herein as RLM/RLF procedure information. The manner in which the UE acquires the RLM/RLF procedure information can vary. In some implementations, the RLM/RLF procedure information can be predetermined by the network and stored in local memory of the UE. In other implementations, the network can determine the RLM/RLF information based on current network conditions and provide the RLM/RLF information to the UE via the system information or the PDCCH.

In one or more embodiments, with respect to RLM for different usage scenarios/traffic types and/or CORESET groups, the RLM/RLF procedure information can define different hypothetical/reference PDCCH transmissions for applying by the UE in association with determining BLER measurements that reflect a downlink radio link quality measurement. For example, as described above, in some implementations, the in-sync and out-of-sync threshold values (e.g., Qin and Qout, respectively) used in RLM are expressed in terms of BLER values that are respectively based on two hypothetical/reference PDCCH transmissions from a serving cell. These hypothetical/reference PDCCH transmissions can be defined differently to account for different usage scenarios/traffic types and/or CORSET groups. In one example, the difference in the hypothetical/reference PDCCH transmissions can correspond to different DCI format definitions for comparison with the in-sync and out-of-sync threshold values. In this regard, the monitoring of the quality of the radio link can comprise determining link quality measurements based on a reference PDCCH transmission, and wherein a format of the DCI used in transmission of the reference PDCCH transmission varies based on the usage scenario. According to this example, the different hypothetical/reference PDCCH transmissions associated with the different usage scenarios/traffic types and/or CORESET groups can vary with respect aggregation levels, resource elements (RE)s, energy ratios, and the like. In another implementation, the RLM/RLF procedure information can define different reference signals for use by the UE when calculating the BLER measurements. For example, the network node 104 can send reference signals associated with different characteristics. For example, the reference signal densities can vary or the manner in which the reference signals occupy the time/frequency resources can vary. Thus the particular reference signals evaluated by the UE to determine radio link quality measurements and/or the manner in which the reference signals are formatted can vary based on the usage scenario. For example, the different hypothetical/reference PDCCH transmissions per usage scenario/traffic type and/or CORESET group can correspond to different reference signal types, different reference signals combinations, and the like used for the comparison with the in-sync and out-of-sync thresholds.

In another embodiment, with respect to RLM for different usage scenarios/traffic types and/or CORESET groups, the RLM/RLF procedure information can define different in-sync and out-of-sync threshold values for applying by the UE when evaluating the radio quality measurements determined by the UE 102. For instance, the in-sync and out-of-sync thresholds can correspond to different BLER targets depending on the quality of service requirements of the different usage scenarios/traffic types and/or CORESET groups. For example, the BLER targets for URLLC traffic can be more stringent than BLER requirements for eMBB traffic. According to this example, the BLER value threshold value (Qout) for determining an out-of-sync measurement for the URLLC traffic can be lower (e.g., 5%) relative to the BLER threshold value (Qout) for determining an out-of-sync measurement for the eMMB traffic (e.g., 12%).

In another embodiment, with respect to RLM for different usage scenarios/traffic types and/or CORESET groups, the RLM/RLF procedure information can define different timers or delay thresholds for declaring that the UE is out-of-sync, and subsequently declaring RLF. These timers can correspond to the out-of-sync detection period 201 and the RLF timer period 202. For example, in some implementations, the number of consecutive out-of-sync detections (N1, wherein N1 can be one or more) to start the RLF timer can be different for different usage scenarios/traffic types and/or CORESET groups. Moreover, the RLF timer duration (i.e., the RLF timer period 202) can be tailored to the different usage scenarios/traffic types and/or CORESET groups. In addition, the number of consecutive out-of-sync detections (N2) that can occur in the RLF timer period 202 before declaring a RLF can also vary based on the different usage scenarios/traffic types and/or CORESET groups. Further, the number of consecutive successful in-sync detections that can occur during the RLF timer period that can cause the UE to abandon the RLF timer period 202, maintain the radio link, and restart the RLM procedure can also vary based on the different usage scenarios/traffic types and/or CORESET groups.

Furthermore, the RLM/RLF procedure information can define different parameters/requirements associated with the RRC connection re-establishment procedure based on the different usage scenarios/traffic types and/or CORESET groups. For example, in some implementations, in order for the UE 102 to successfully re-establish the RRC connection, the UE can be required to complete one or more RRC connection re-establishment tasks within a defined time period or time delay. For example, in the embodiment shown in FIG. 2, the UE can be required to provide the RRC reconnection request within a defined RRC re-establishment period 203. In another implementation, the RRC connection re-establishment procedure can include a defined time delay for acquiring the uplink grant for sending the RRC reconnection request message, a defined time delay to search for the target cell, a defined time delay to read the target cell system information, a defined time delay to complete a random access procedure, and the like. Accordingly, one or more of these various defined time delays or time periods can be also tailored based on the quality of service requirement(s) associated with the different usage scenarios/traffic types and/or CORESET groups. For example, the time required for performance of a random access procedure can be configured to be lower for latency constrained systems as opposed to usage scenarios that are less latency constrained.

The random access procedure, also referred to as the random access channel (RACH) procedure, is a specific RRC connection procedure that is used by UEs in LTE and NR communication systems to recover from a RLF. Thus in various embodiments, the RRC connection re-establishment procedure can be or involve the RACH procedure.

Figure 3:
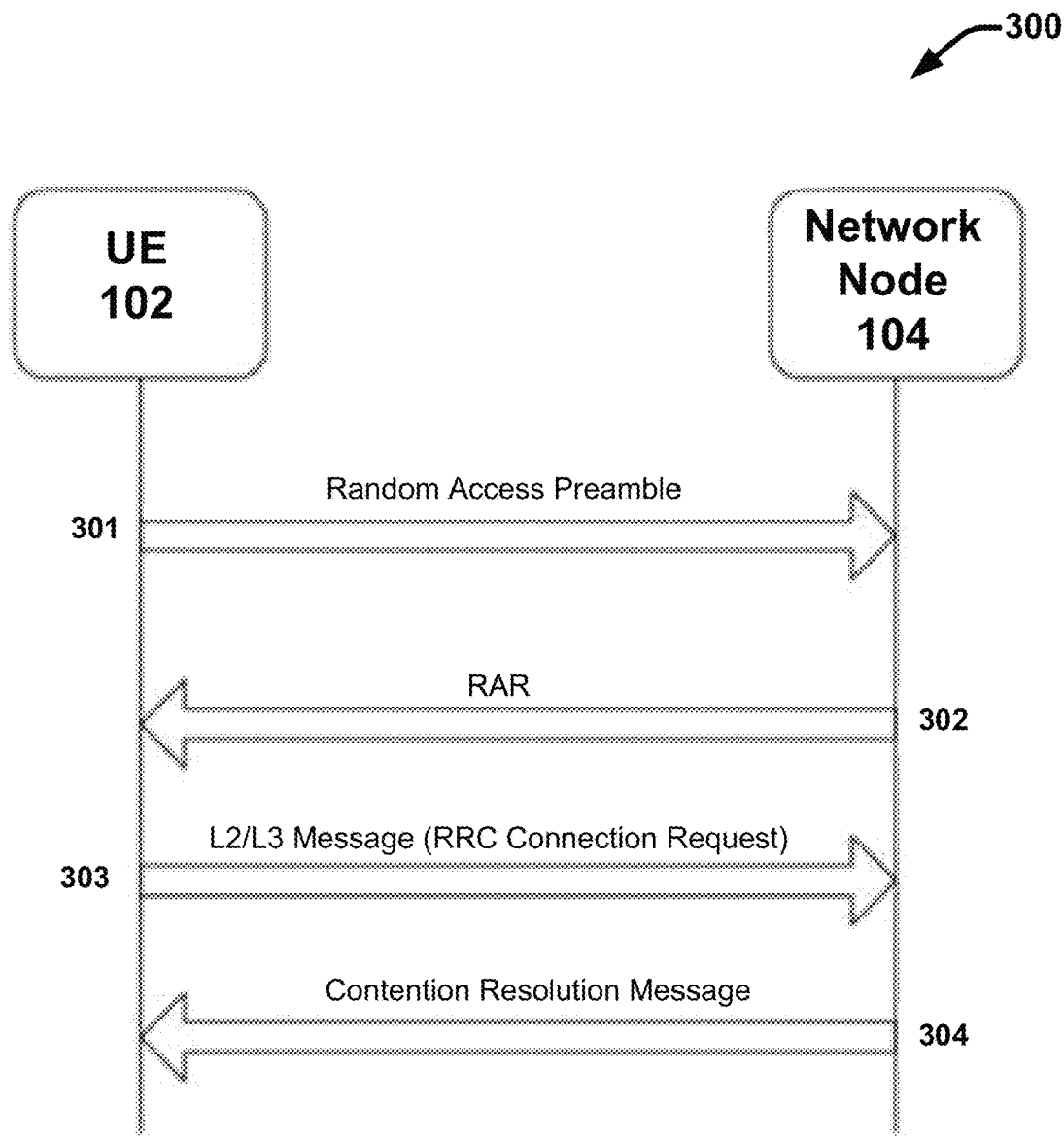
FIG. 3 provides a diagram demonstrating principles of a random access channel (RACH) procedure in accordance with various aspects and embodiments of the subject disclosure.

FIG. 3 provides a diagram 300 demonstrating example principles of the LTE RACH procedure in accordance with various aspects and embodiments of the subject disclosure. Repetitive description of like elements employed in respective embodiments is omitted for sake of brevity.

As shown in diagram 300, the RACH procedure consists of four steps or RACH events. These RACH events include the transmission of the random access preamble by the UE to the network node at 301; the transmission of the random access response (RAR) message by the network node 104 to the UE at 302, the transmission of the L2/L3 message (which comprises RRC connection request) by the UE 102 to the network node 104 at 303; and the transmission of the contention resolution message by the network node 104 to the UE 102 at 304. In various embodiments, one or more of the RACH events/steps can be configured differently for the different usage scenarios/traffic types and/or CORESET groups. For example, in some implementations, the time/frequency resources used for RACH preamble transmission can be tailored to each particular usage scenario/traffic type and/or CORSET group. In this regard, the manner in the time/frequency resources occupied by the preamble and/or the manner in which the RACH resources are multiplexed in time or frequency can be tailored to account for a particular usage scenario/traffic type and/or CORSET group (and the associated quality of service requirement(s)). In another embodiment of the configuration of RACH procedure, the RAR window can be configured for a particular usage scenario/traffic type and/or CORSET group. For example, the UE expects to receive the RAR within a defined time window, of which the start and end are configured by the network and broadcast as part of the cell-specific system information. This RAR window can be configured per each usage scenario/traffic type and/or CORESET group, such that the RAR window is shorter for latency constrained usage scenarios.

Figure 4:
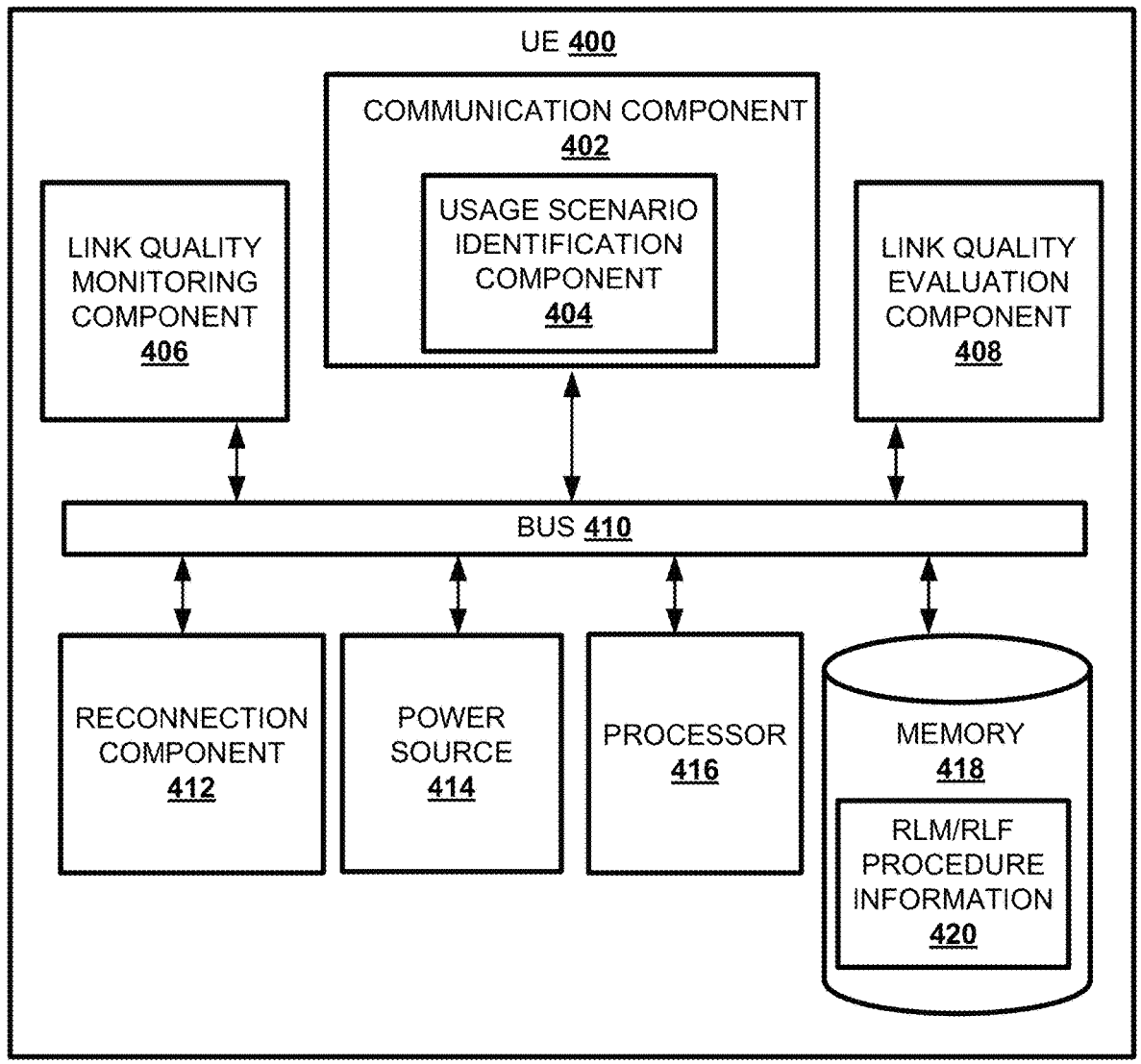
FIG. 4 provides an example UE that facilitates detecting and correcting radio link failures based on different usage scenarios in accordance with various aspects and embodiments of the subject disclosure.

FIG. 4 provides an example UE 400 that facilitates detecting and correcting radio link failures based on different usage scenarios in accordance with various aspects and embodiments of the subject disclosure in accordance with various aspects and embodiments of the subject disclosure. In various embodiments, the UE 102 of wireless communication system 100 can be or include UE 400, or vice versa. Repetitive description of like elements employed in respective embodiments is omitted for sake of brevity.

In the embodiment shown, UE 400 can include communication component 402, link quality monitoring component 406, link quality evaluation component 408, and reconnection component 412. The UE 400 can also include power source 414, a processor 416 and a memory 418. The power source 414 can include, but is not limited to, a battery, a capacitor, a charge pump, a mechanically derived power source (e.g., microelectromechanical systems (MEMs) device), or an induction component. The memory 418 can be configured to store computer executable components and instructions (e.g., one or more software components of the communication component 402, such as the usage scenario identification component 404, the link quality monitoring component 406, the link quality evaluation component 408 and the reconnection component 412. The processor 416 can be configured to facilitate operation of the computer executable components and instructions by the UE 400. In some implementations, the memory 418 can also store the RLM/RLF procedure information 420. The UE 400 can also include a device bus 410 that couples the various components of the UE, including but not limited to the communication component 402, the link quality monitoring component 406, the link quality evaluation component 408, the reconnection component 412, the power source 414, the processor 416 and the memory 418. Examples of said processor 416, and memory 418, as well as other suitable computer or computing-based elements that can be employed by the UE 400, can be found with reference to FIG. 11.

With reference to FIGS. 1, 2, 3 and 4, the communication component 402 can be configured to facilitate various wired and wireless communications between the UE and other devices, including at least the network node 104. The types of communications can include a plurality of different types in accordance with various wireless communication technologies. In accordance with one or more embodiment so the discloses subject matter, the communication component 402 can facilitate at least wireless communications associated with different NR usage scenarios (e.g., eMMB, URLLC, and mMTC for example). The communication component 402 can include software, hardware, or a combination of software and hardware that is configured to facilitate such wired and/or wireless communications. For example, the communication component 402 can be or include hardware (e.g., a central processing unit (CPU), one or more transmitters, one or more receivers, one or more transceivers, one or more decoders), software (e.g., a set of threads, a set of processes, software in execution) or a combination of hardware and software that facilitates one or more of the various types of wireless communications described herein.

In the embodiment shown, the communication component 402 can include the usage scenario identification component 404 to facilitate determining the particular usage scenario associated with a current or intended usage of a radio link established between the UE and the network node 104. In this regard, the usage scenario identification component 404 can be configured to determine one or more of: the particular usage scenario associated with a current or intended usage of the radio link, a quality of service requirement associated with the usage scenario, a type of traffic associated with the usage scenario, and a CORESET group associated with the usage scenario. Based on the determined usage scenario, quality of service requirement, traffic type and/or CORESET group, the UE can determine which particular RLM, RLF and/or RRC connection re-establishment parameters and requirements to apply as defined by the RLM/RLF procedure information 420.

For example, with respect to the out-of-sync detection period 201, the RLM/RLF procedure information can 420 include but is not limited to, for each (or in some cases one or more) different usage scenario/traffic type and/or CORSET group: the particular characteristics of the hypothetical/reference PDCCH transmissions to be applied to determine the BLER values corresponding to link quality measurements, the particular reference signal characteristics/combinations used to determine the BLER values, the specific Qout and Qin values, and the number (e.g., N1) of consecutive out-of-sync indications applied to initiate the RLF timer.

With respect to the RLF timer period 202, the RLM/RLF procedure information 420 can include but is not limited to, for each (or in some cases one or more) different usage scenario/traffic type and/or CORSET group: the particular characteristics of the hypothetical/reference PDCCH transmissions to be applied to determine the BLER values corresponding to link quality measurements (which can be the same or different relative to those associated with the out-of-sync detection period 201), the particular reference signal characteristics/combinations used to determine the BLER values (which can be the same or different relative to those associated with the out-of-sync detection period 201), and the specific Qout and Qin values (which can be the same or different relative to those associated with the out-of-sync detection period 201). In addition, with respect to the RLF timer period, the RLM/RLF procedure information 420 can include but is not limited to, for each (or in some cases one or more) different usage scenario/traffic type and/or CORSET group: the duration of the RLF timer or RLF timer period, and possible number (N2) of consecutive in-sync indications required to Stop the RLF timer, and return to the RLM procedure.

With respect to the RRC re-establishment period 203, the RLM/RLF procedure information can 420 include bust is not limited to, for each (or in some cases one or more) different usage scenario/traffic type and/or CORESET group: time delays or time periods defined for one or more RACH events (e.g., the time period for receiving the RAR, the time period for providing the RRC connection request, and the like), as well as time/frequency resources used for one or more of the RACH events (e.g., the preamble transmission), and multiplexing requirements for multiple RACH resources in time or frequency.

The link quality monitoring component 406 can be configured to perform the various aspects of RLM discussed herein in accordance with the applicable RLM parameters that correspond to the current usage scenario/traffic type, CORSET group and/or associated quality of service requirements as determined by the usage scenario identification component 404. For example, the link quality monitoring component 406 can be configured to monitor the quality of a radio link established between the UE 400 and the network node 104 based on downlink transmissions received from the network device. In this regard, the link quality monitoring component 406 can be configured to determine link quality measurements (e.g., BLER values) based on at least some of the downlink transmissions and a hypothetical/reference PDCCH transmission associated with the current usage scenario (e.g., wherein the hypothetical/reference PDCCH transmission varies based on the usage scenario). In some implementations, the hypothetical/reference PDCCH transmission can vary with respect to the CSI formatting. In another implementation, the link quality monitoring component 406 can determine the link quality measurements based on reference signals, wherein the reference signals vary based on the usage scenario (e.g., with respect to combinations thereof, formatting, density, etc.).

The link quality evaluation component 408 can be configured to evaluate the downlink radio link quality based on the measurements monitored by the link quality monitoring component 406 to determine if the UE and the network node are sufficiently out-of-sync to initiate the RLF timer and to declare RLF in accordance with the mechanisms discussed herein. The determinations/evaluations made by the link quality evaluation component 408 can also be tailored to reflect the applicable RLM parameters that correspond to the current usage scenario/traffic type, CORESET group and/or associated quality of service requirements as determined by the usage scenario identification component 404. For example, the link quality monitoring component 408 can be configured to determine whether the monitored link quality indicates the device and the network device are out of synchronization based on the link quality being below a defined quality level, wherein the defined quality level varies based on a usage scenario associated with usage of the radio link by the device. In this regard, the defined quality level and the measured quality of radio link can reflect one or more RLM/RLF parameters that are tailored to the usage scenario, including but not limited to: the particular characteristics of the hypothetical/reference PDCCH transmissions applied to determine the BLER values corresponding to link quality measurements, the particular reference signal characteristics/combinations used to determine the BLER values, the specific Qout and Qin values, and the number of consecutive out-of-sync indications applied to initiate the RLF timer. Based on a first determination that the quality of the radio link indicates the UE 400 and the network node 104 are out-of-sync, the link quality evaluation component 408 can further determine, based on continued monitoring of the downlink radio link quality during the RLF timer period 202, the link quality indicates a failure of the radio link based on the quality remaining below the defined quality level for the defined time period. Again, this determination can be based on specific parameters associated with the current usage scenario as defined in the RLM/RLF procedure information 420.

Further, the reconnection component 412 can be configured to control performance of the RRC connection re-establishment procedure by the communication component 402 in accordance with the various mechanisms discussed herein which can be specifically defined in the RLM/RLF procedure information 420 for the different usage scenarios. For example, the reconnection component 412 can direct the communication component 402 to apply a particular timer for the RRC reconnection period that is configured for the CORESET group associated with usage of the failed radio link. In another example, the reconnection component 412 can direct the communication component 402 to apply a particular time/frequency resource allocation and/or multiplexing for the RACH preamble that is configured specifically for the traffic type associated with usage of the failed radio link.

Figure 5:
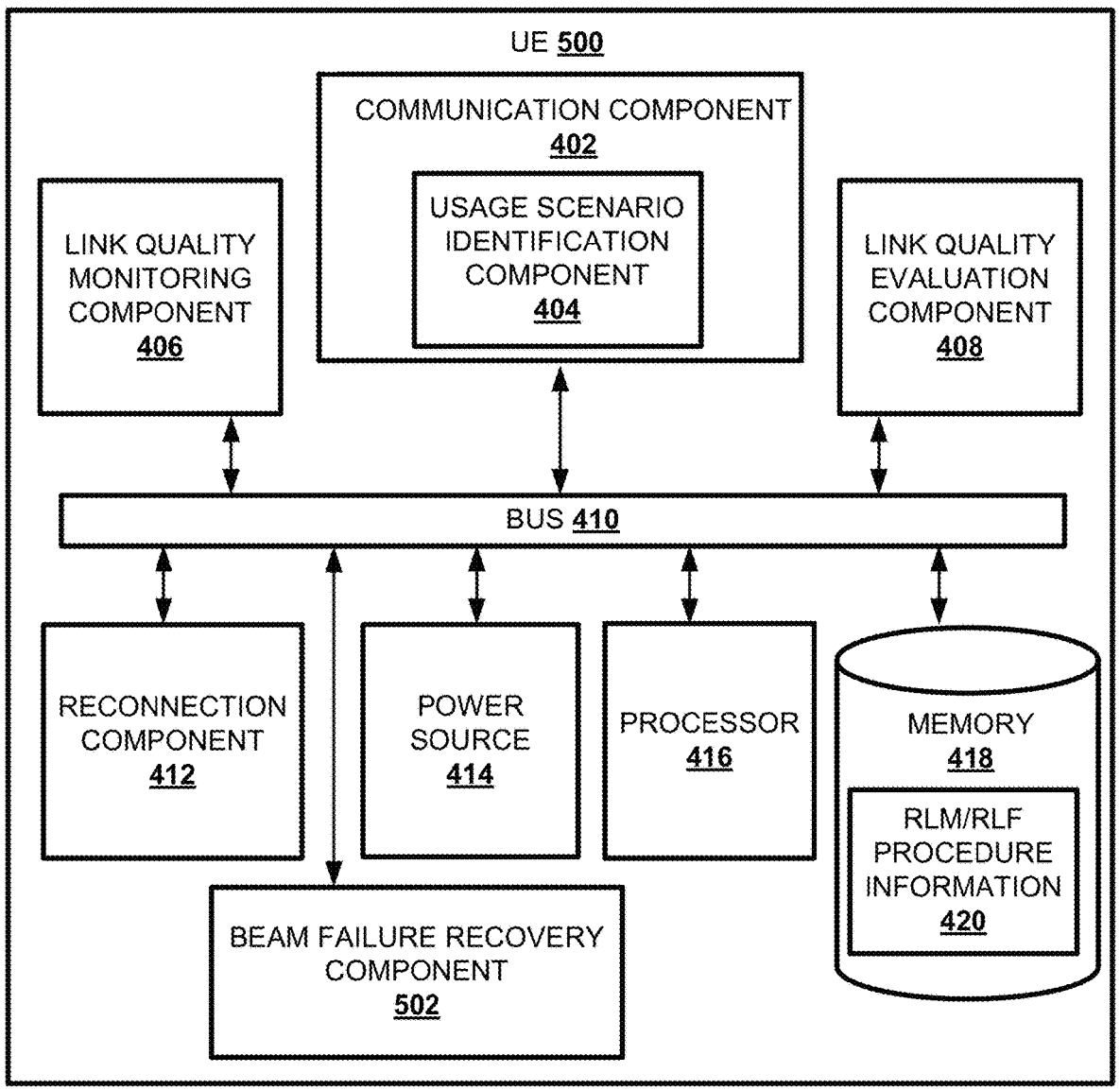
FIG. 5 provides another example UE that facilitates detecting and correcting radio link failures based on different usage scenarios in accordance with various aspects and embodiments of the subject disclosure.

FIG. 5 provides another example UE 500 that facilitates detecting and correcting radio link failures based on different usage scenarios in accordance with various aspects and embodiments of the subject disclosure in accordance with various aspects and embodiments of the subject disclosure. UE 500 can include same or similar features and functionalities as UE 400 with the addition of the beam failure recovery component 502. Repetitive description of like elements employed in respective embodiments is omitted for sake of brevity.

The RLM procedure and triggering of RLF is linked to a physical layer procedure called beam failure recovery. In accordance with various NR standards, the network will use a certain beam to talk to another beam of the UE 500. These respective beams establish what is referred to as a beam pair link (BPL). The UE 500 can be configured with one or multiple sets of BPLs. Each set of BPL is associated with one reference signal (RS) resource, and can correspond to one CORESET group, traffic type, usage scenario, etc. In certain deployment scenarios, one or more of the BPLs can become blocked due a blockage effect in the channel, especially at higher frequencies. When a BPL is blocked, the UE 500 cannot communicate information with the network node via the BPL. Accordingly, when all of the UEs BPLs are blocked, the radio link essentially fails. In order to recover from a BPL blockage, the UE uses what is known as a beam failure recovery process to find another link or otherwise perform a series of steps to recover the blocked PBL. If it cannot recover, and all of the UEs BPLs are blocked, the UE declares a RLF. The UE 500 can then be configured to initiate the RRC connection re-establishment procedure according to the various aspects and embodiments described herein (e.g., wherein one or more aspects of the RACH procedure are tailored to a particular usage scenario/traffic type and/or CORESET group).

Figure 6:
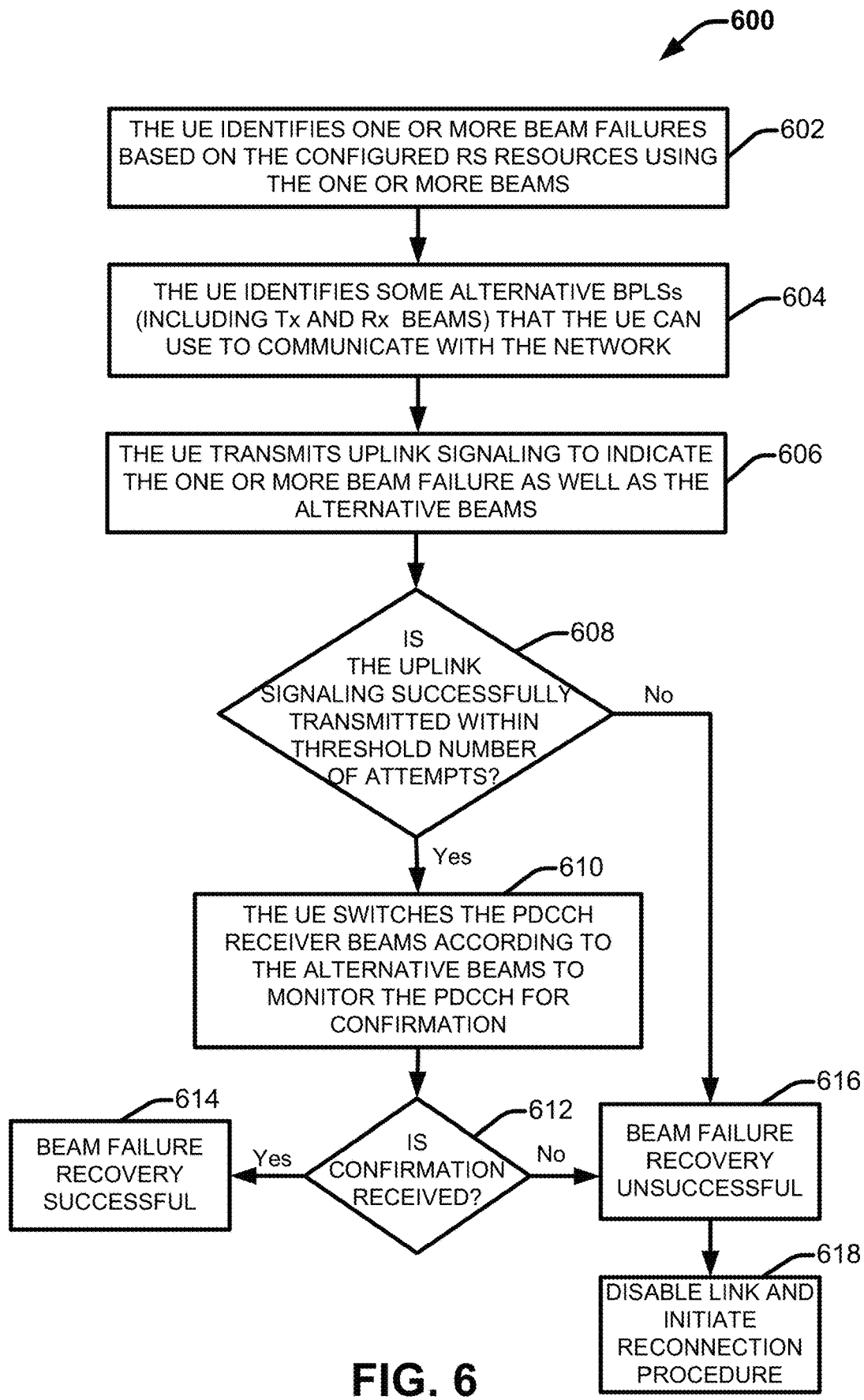
FIG. 6 provides flow diagram describing example principles of a beam failure recovery procedure in accordance with various aspects and embodiments of the subject disclosure.

FIG. 6 provides a flow diagram 600 describing example principles of a beam failure recovery procedure in accordance with various aspects and embodiments of the subject disclosure. The basic working procedure is as follows. At 602, the UE identifies one or more beam failures based on the configured RS resources using the one or more beams. For example, beam failure recovery can run on a plurality of beams and the UE can perform the beam failure recovery process on each of the beams. At 604, the UE identifies some alternative BPLs (including transmitter (Tx) and receiver (Rx) beams) that the UE can use to communicate with the network. At 606, the UE transmits uplink signaling to indicate the beam failure as well as the alternative beams. In some implementations, if at 608 the UE is unable to successfully transmit the uplink signaling information within the threshold number of attempts, then the beam failure recovery process processed to 616, wherein the UE considers the beam failure recovery process unsuccessful. The UE can then disable the link and initiate the reconnection procedure at 618.

However, if at 608, the uplink signaling is successfully transmit to the network node within a defined number or threshold number of attempts, the UE can proceed to 610. At 610, the UE switches the PDCCH receiver beam according to the alternative beams to monitor the PDCCH for confirmation. If at 612, the UE determines the configuration is received, the UE declares the beam failure recovery procedure successful at 614 and maintains the integrity of the radio link between the UE and the network node. However if at 612, the confirmation is not received, then at 616, the UE declares the beam failure recovery procedure unsuccessful. As a result, at 618, the UE declares RLF, disables the radio link, and initiates the RRC connection re-establishment procedure. Also, at 608, if the UE unsuccessfully attempts to transmit uplink signaling to indicate the beam failure as well as the alternative beams a certain configurable number of times, the UE declares the beam failure recovery procedure unsuccessful. Although FIG. 6 demonstrates some reasons why beam pair recovery may be unsuccessful, it should be appreciated that these are merely exemplary and that there are multiple reasons why the beam recovery procedure fails and hence RLF is triggered.

With reference to FIGS. 5 and 6 in various embodiments, the beam failure recovery component 502 can be configured to facilitate detecting BPL blockages and performance of the beam failure recovery procedure by the UE 500. For example, the beam failure recovery component 502 can declare RLF in response to unsuccessful beam failure recovery procedures when the UE 500 cannot communicate with the network via its respective BBLs. The beam failure recovery component 502 can further direct the communication component 402 to initiate and perform the RRC connection re-establishment procedure, (particular the RACH procedure in some implementations), in accordance with the parameters and protocols associated with the current usage scenario/traffic type and/or CORESET group.

Furthermore, in some embodiments, in association with performance of the RRC connection re-establishment procedure, the usage scenario identification component 404 can direct the communication component 402 to differentiate between the different reasons to why a RLF was declared with respect based on the current usage scenario/traffic type and/or CORESET group. In this regard, in association with performance of the RRC connection re-establishment procedure, the communication component 402 can provide the network node 104 with information identifying the reason for the RLF. This reason can include for example, a determination the UE and the network node 104 are out-of-sync depending on the current usage scenario. This reason can also include a determination that a beam failure recovery procedure was unsuccessful in associated with a particular CORESET group associated with the blocked BPL(s). In some implementations, the information provided by the communication component 402 to the network node indicating the reason for the RLF can also identify the current usage scenario/traffic link and/or CORESET group considered by the UE when determining the RLF. In some embodiments, information regarding the reason for the RLF failure and/or the associated usage scenario/traffic link and/or CORESET group can be provided by the communication component 402 to the network node with the RRC connection request message (e.g., message L2/L3 of the RACH procedure) during the RRC connection re-establishment.

In one or more embodiments, based on the indicated RLF reason, which can correspond to the usage scenario, the network node response can be configurable. In one example, the network node 104 can determine a whether to perform a fast re-activation of the RRC connection as opposed to a standard re-activation. In another example, the network node can determine to whether to reconfigure or reactive the RRC connection in association with re-establishment of the radio link based on the particular reason for the RLF and the associated usage scenario/traffic type and/or CORESET group. In this regard, the determination to reconfigure verses reactivate the radio link can be based on the usage scenario. In one example, based on information included in the RRC connection request indicating a latency constrained usage scenarios was attributed to the RLF determination, the network node 104 can be configured to perform a fast re-activation of the radio link (as opposed to a standard slower reactivation of the radio link) to overcome the delays corresponding to the RRC connection re-establishment.

Figure 7:
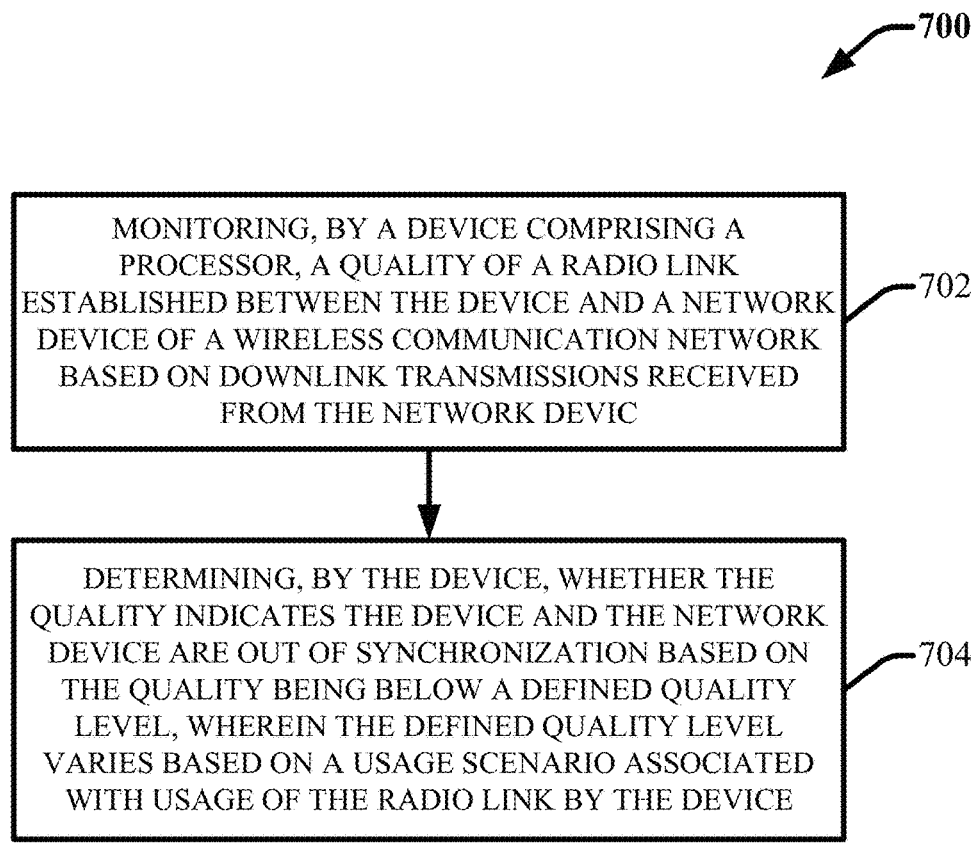
FIG. 7 illustrates an example method for detecting radio link failures based on different usage scenarios in accordance with various aspects and embodiments of the subject disclosure.
Figure 8:
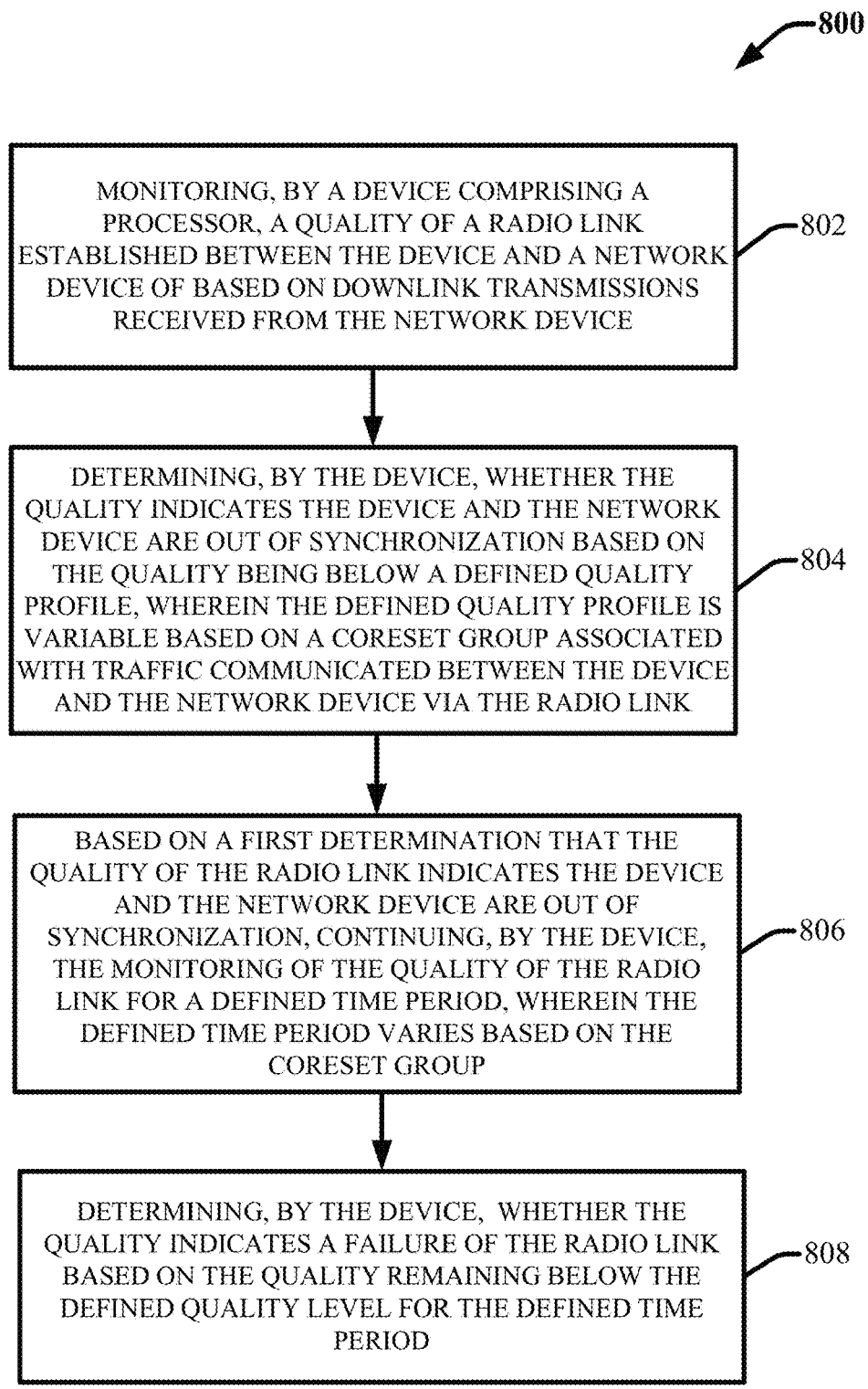
Figure 9:
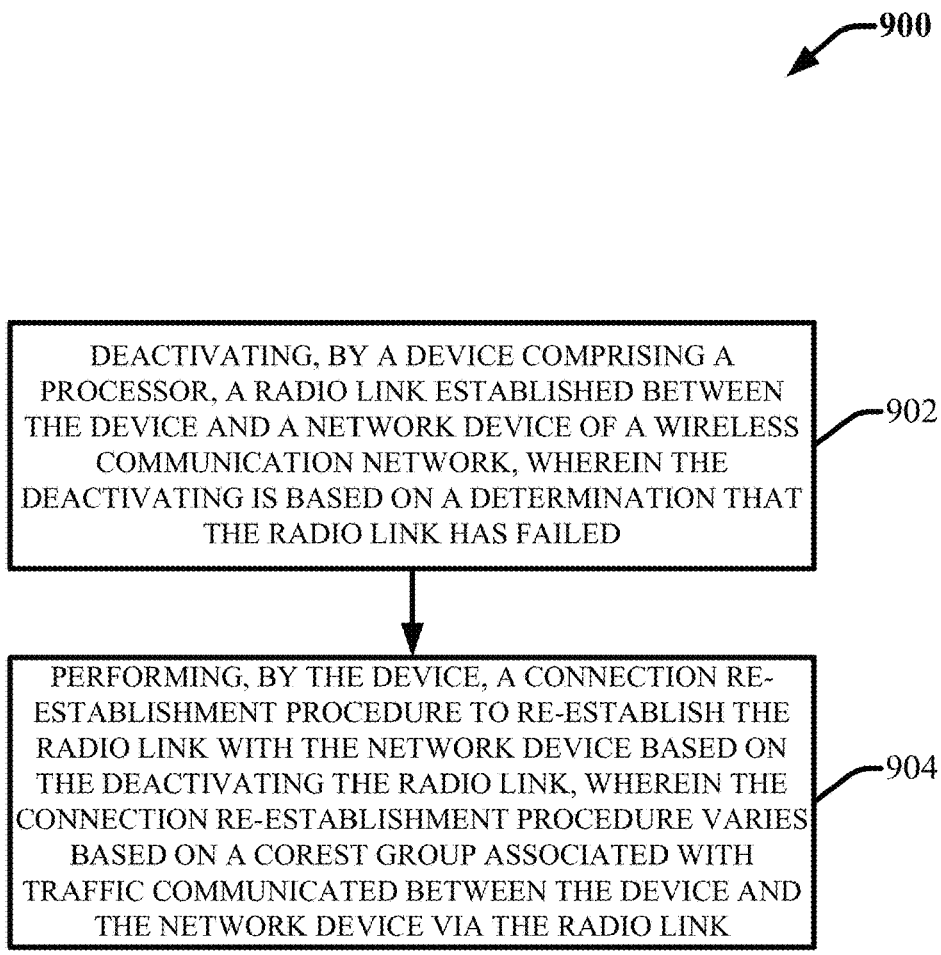
FIG. 9 illustrates an example method for detecting and correcting radio link failures based on different usage scenarios in accordance with various aspects and embodiments of the subject disclosure.

In view of the example system(s) described above, example method(s) that can be implemented in accordance with the disclosed subject matter can be better appreciated with reference to flowcharts in FIGS. 7-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates an example method 700 for detecting radio link failures based on different usage scenarios in accordance with various aspects and embodiments of the subject disclosure. Repetitive description of like elements employed in respective embodiments is omitted for sake of brevity.

At 702, a device comprising a processor (e.g., a UE 102, UE 400, UE 500 or the like), monitors (e.g., using the link quality monitoring component 406) a quality of a radio link established between the device and a network device (e.g., network node 104) of a wireless communication network based on downlink transmissions received from the network device. At 704, the device determines (e.g., using the link quality evaluation component 408) whether the quality indicates the device and the network device are out of synchronization based on the quality being below a defined quality level, wherein the defined quality level varies based on a usage scenario associated with usage of the radio link by the device. In this regard, the defined quality level and the measured quality of radio link can reflect one or more RLM/RLF parameters that are tailored to the usage scenario, including but not limited to: the particular characteristics of the hypothetical/reference PDCCH transmissions applied to determine the BLER values corresponding to link quality measurements, the particular reference signal characteristics/combinations used to determine the BLER values, the specific Qout and Qin values, and the number of consecutive out-of-sync indications applied to initiate the RLF timer.

FIG. 8 illustrates another example method 800 for detecting radio link failures based on different usage scenarios in accordance with various aspects and embodiments of the subject disclosure in. Repetitive description of like elements employed in respective embodiments is omitted for sake of brevity.

At 802, a device comprising a processor (e.g., a UE 102, UE 400, UE 500 or the like), monitors (e.g., using the link quality monitoring component 406) a quality of a radio link established between the device and a network device (e.g., network node 104) of a wireless communication network based on downlink transmissions received from the network device. At 804, the device determines (e.g., using the link quality evaluation component 408) whether the quality indicates the device and the network device are out of synchronization based on the quality being below a defined quality level, wherein the defined quality level varies based on a CORESET group associated with traffic communicated between the device and the network device via the radio link. In this regard, the defined quality level and the measured quality of radio link can reflect one or more RLM/RLF procedure requirement/parameters that are tailored to the CORESET group, including but not limited to: the particular characteristics of the hypothetical/reference PDCCH transmissions applied to determine the BLER values corresponding to link quality measurements, the particular reference signal characteristics/combinations used to determine the BLER values, the specific Qout and Qin values, and the number of consecutive out-of-sync indications applied to initiate the RLF timer.

At 806, based on a first determination that the quality of the radio link indicates the device and the network device are out of synchronization, the device continues, the monitoring of the quality of the radio link for a defined time period (e.g., the RLF timer period 202), wherein the defined time period is variable based on the CORSET group. At 808, the device further determines, (e.g., using the link quality evaluation component 408) whether the quality indicates a failure of the radio link based on the quality remaining below the defined quality profile for the defined time period. In this regard, quality can be considered to remain below the defined threshold quality if the UE continues to detect out-of-sync indications over the duration of the RLF timer period and/or the UE does not detect a defined number of consecutive in-sync indications within the RLF timer period to forgo declaration of a RLF and stop the RLF timer. In addition to the duration of the RLF timer, the measure for determining the out-of sync indications is again tailored to the current CORSET group. Likewise, the measure for the in-sync indications and the defined number of in-sync indications can be tailored to the current CORESET group.

FIG. 9 illustrates an example method 900 for detecting and correcting radio link failures based on different usage scenarios in accordance with various aspects and embodiments of the subject disclosure. Repetitive description of like elements employed in respective embodiments is omitted for sake of brevity.

At 902, a device comprising a processor (e.g., a UE 102, UE 400, UE 500 or the like), deactivates (e.g., using the communication component 402) a radio link established between the device and a network device (e.g., the network node 104) of a wireless communication network, wherein the deactivating is based on a determination that the radio link has failed monitors (e.g., e.g., a determination of RLF by link quality monitoring component 406). For example, the deactivation of the radio link can involve the UE turning off its transmitter to avoid interference associated with subsequent performance of the RRC connection re-establishment procedure. At 904, the device performs the connection re-establishment procedure (e.g., using the communication component 402 and the reconnection component 412) to re-establish the radio link with the network device based on the deactivating the radio link, wherein the connection re-establishment procedure varies based on a CORESET group associated with traffic communicated between the device and the network device via the radio link. For example, one or more timers or delay requirements associated with one or RACH events can be applied that are specifically tailored to the current CORSET group (e.g., the RAR window and/or the RRC re-establishment period 203). In another example, time/frequency resources used for RACH preamble transmission can be configured based on CORESET group. In various implementations, the usage scenario identification component 404 can instruct the communication component regarding the specific RRC connection re-establishment parameters to apply during the RRC connection re-establishment procedure based on the identified CORSET group associated with the traffic and the RLM/RLF procedure information. Further, in some embodiments, the connection re-establishment procedure can comprise sending a connection request (e.g., the RRC connection request/the L2/L3 message of the RACH procedure) by the device to the network device comprising information identifying a reason for the RLF based on the CORSET group. For example, the reason can be selected from a group comprising: a synchronization failure between the device and the network device, and an inability to successfully perform a beam failure recovery process.

The proposed novel RLM/RLF and RRC connection re-establishment procedures based on CORESET groups that correspond to different usage scenarios/traffic types and quality of service requirements allows for true flexibility in meeting key performance requirements for the various types of traffic envisioned. The proposed configurable RLM/RLF procedures allow for flexible mechanisms to be implemented resulting in improved performance when reliability and latency are key performance metrics. Furthermore differentiating between random access procedure delay and resource requirements for various usage scenarios, and hence different CORESET groups, results in a more optimized and targeted procedure towards the corresponding traffic.

Figure 10:
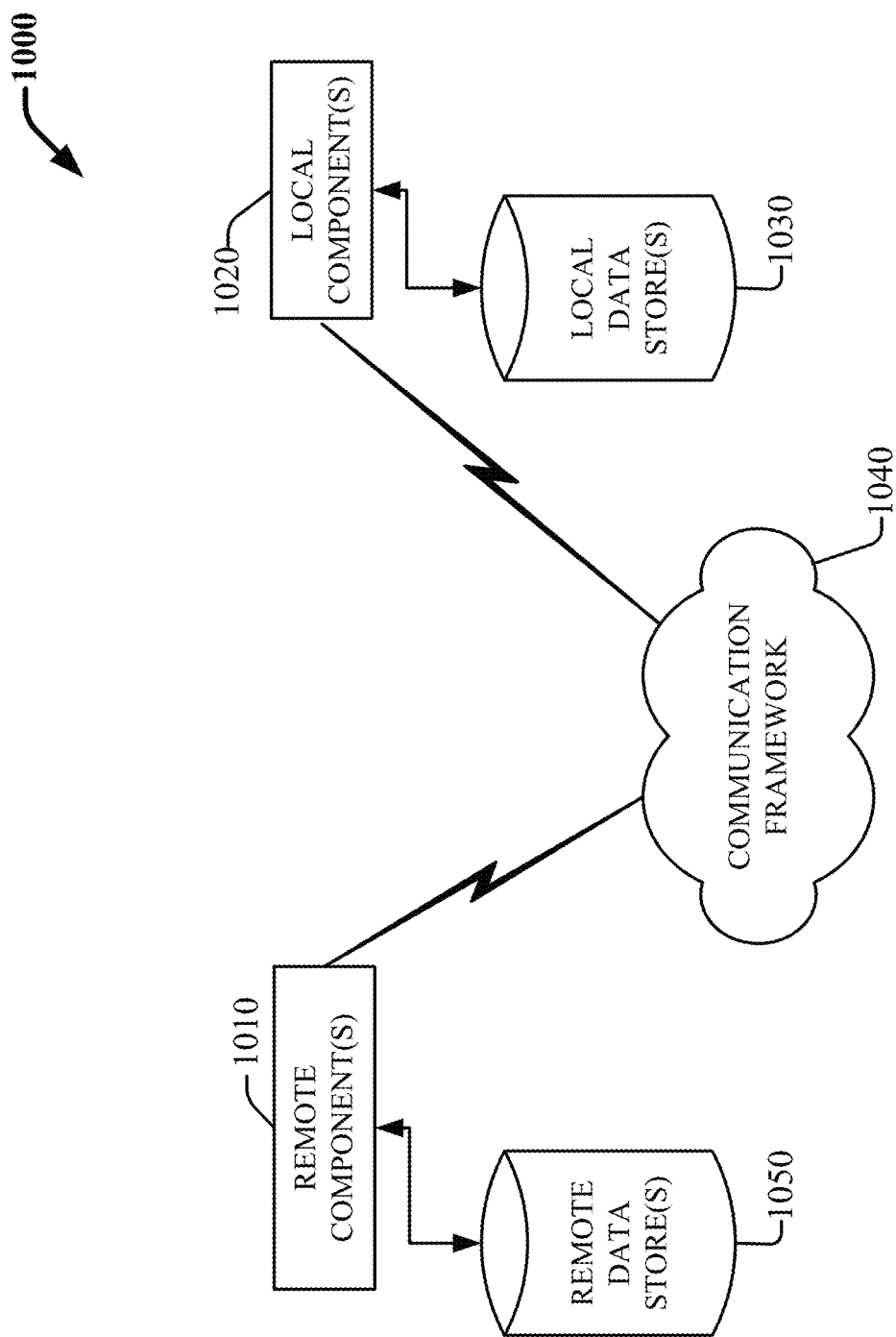
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be network node 104, one or more network devices 108, and the like. The system 1000 also comprises one or more local component(s) 1020. The local component(s) 1020 can be hardware and/or software (e.g., threads, processes, computing devices). In some embodiments, local component(s) 1020 can comprise, for example, UE 102, UE 400, UE 500 and the like.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via an LTE network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
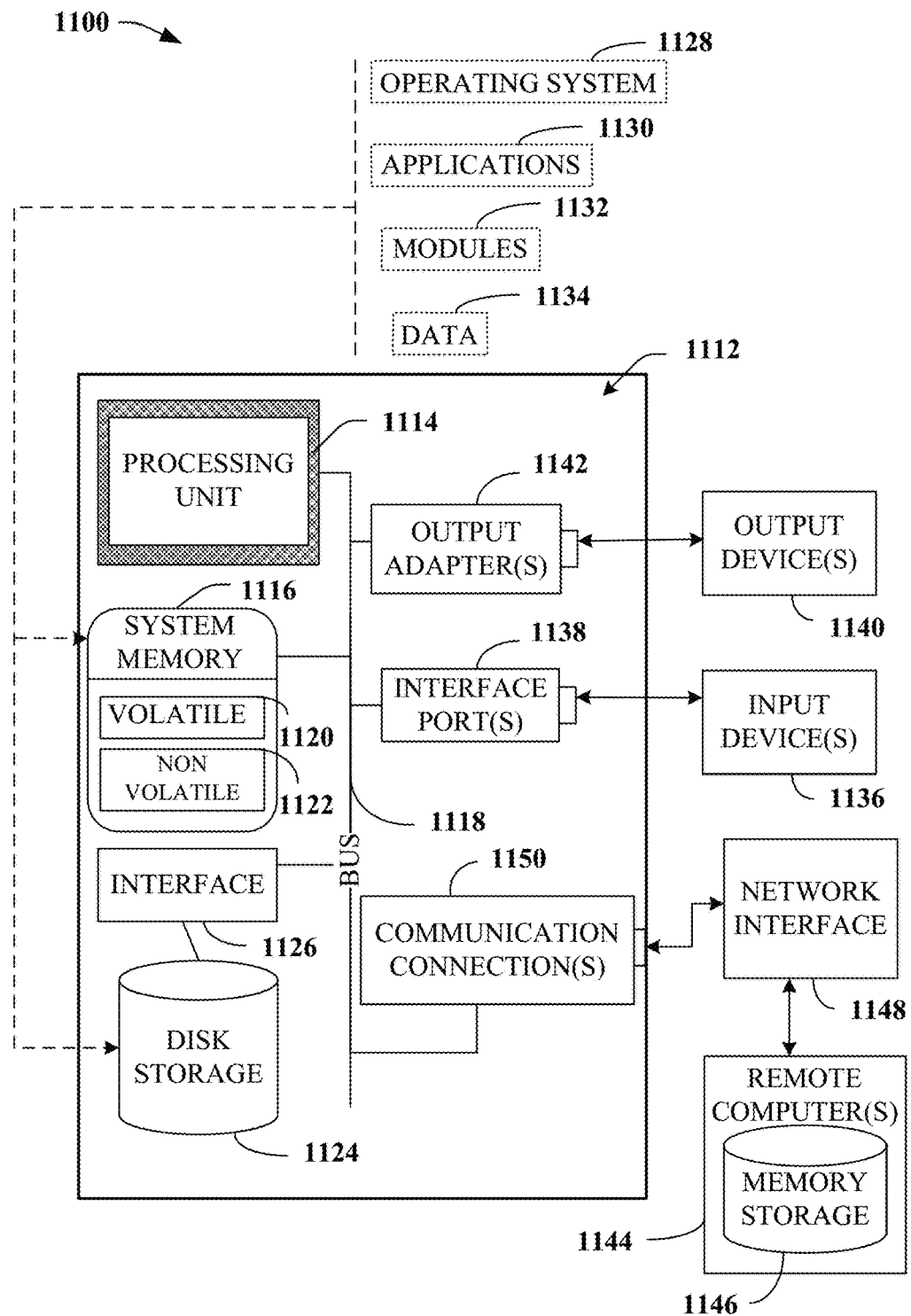
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, a UE (e.g., UE 102 and 400, 500 and the like), a network node (e.g., network node 104), a core network device (e.g., network device 108), and the like comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11104), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor, and
   a memory that stores executable instructions that, when executed by the processor, facilitate performance of operations, comprising:
   determining a control channel resource set group applicable to decoding downlink control information for a type of traffic to be communicated between the device and network equipment using a radio link established between the device and the network equipment;
   determining a radio link monitoring protocol applicable to monitoring a quality of the radio link for determining a radio link failure based on the control channel resource set group, wherein the network equipment configures different control channel resource set groups for different types of traffic, and wherein different radio link monitoring protocols are respectively defined for the different control channel resource set groups;
   monitoring the quality of the radio link in accordance with the radio link monitoring protocol;
   determining whether the radio link failure occurs based on the monitoring;
   deactivating the radio link with the network equipment based on a determination that the radio link failure has occurred;
   determining time and frequency resources for a preamble transmission of a random access procedure for re-establishing the radio link with the network equipment based on the control channel resource set group, wherein the time and frequency resources for the preamble transmission vary for the different control channel resource set groups; and
   performing the random access procedure using the time and frequency resources for the preamble transmission.

2. The device of claim 1, wherein the different types of traffic are selected from a group comprising: enhanced mobile broadband traffic, ultra reliable and low latency traffic, and massive machine type communication traffic.

3. The device of claim 1, wherein monitoring the quality of the radio link comprises determining link quality measurements based on physical downlink control channel transmissions received via the radio link and monitoring occurrences of consecutive out-of-sync link quality measurements of the link quality measurements that indicate the device and the network equipment are out of synchronization.

4. The device of claim 3, wherein monitoring the occurrences of the consecutive out-of-sync link quality measurements comprises determining the out-of-sync link quality measurements based on a threshold quality value that varies based on the radio link monitoring protocol.

5. The device of claim 3, wherein the determining whether the radio link failure occurs comprises determining whether the radio link failure has occurred based on detection of the consecutive out-of-sync link quality measurements over a defined period of time, and wherein the defined period of time varies based on the radio link monitoring protocol.

6. The device of claim 3, wherein monitoring the quality of the radio link comprises initiating a radio link failure timer in response to detection of a defined number of the consecutive out-of-sync link quality measurements, and wherein the radio link failure timer duration varies based on the radio link monitoring protocol.

7. The device of claim 6, wherein the defined number of the consecutive out-of-sync link quality measurements varies based on the radio link monitoring protocol.

8. The device of claim 1, wherein monitoring the quality of the radio link comprises determining link quality measurements based on physical downlink control channel transmissions received via the radio link, and wherein a format of the physical downlink control channel transmissions varies based on the control channel resource set group.

9. The device of claim 1, wherein monitoring the quality of the radio link comprises determining link quality measurements based on reference signals received via the radio link, and wherein the reference signals vary based on the control channel resource set group.

10. The device of claim 1, wherein the random access procedure varies based on the control channel resource set group.

11. The device of claim 10, wherein the random access procedure varies with respect to a timer associated with performance of the random access procedure.

12. The device of claim 10, wherein the random access procedure varies with respect to a configuration parameter associated with resources used for the random access procedure.

13. The device of claim 1, wherein performing the random access procedure further comprises sending information to the network equipment indicating a reason for the determination that the radio link failure occurred in association with transmission of message 3 in accordance with the random access procedure, and wherein the reason varies based on the control channel resource set group.

14. A method, comprising:
  determining by a device comprising a processor, a control channel resource set group applicable to decoding downlink control information for a type of traffic to be communicated between the device and network equipment using a radio link established between the device and the network equipment;
  determining, by the device, a radio link monitoring protocol applicable to monitoring a quality of the radio link for determining a radio link failure based on the control channel resource set group, wherein the network equipment configures different control channel resource set groups for different types of traffic, and wherein different radio link monitoring protocols are respectively defined for the different control channel resource set groups;
  monitoring, by the device, the radio link in accordance with the radio link monitoring protocol;
  determining, by the device, whether the radio link failure occurs based on the monitoring;
  deactivating, by the device, the radio link with the network equipment based on a determination that the radio link failure has occurred;
  determining, by the device, time and frequency resources for a preamble transmission of a random access procedure for re-establishing the radio link with the network equipment based on the control channel resource set group, wherein the time and frequency resources for the preamble transmission vary for the different control channel resource set groups; and
  performing, by the device, the random access procedure using the time and frequency resources for the preamble transmission.

15. The method of claim 14, wherein the monitoring comprises monitoring occurrences of consecutive out-of-sync link quality measurements determined based on physical control channel transmissions received via the radio link, and wherein the out-of-sync link quality measurements are determined based on a threshold quality value that varies based on the radio link monitoring protocol.

16. The method of claim 14, wherein performing the random access procedure further comprises:
  sending, by the device, information to the network equipment indicating a reason for the determination that the radio link failure occurred in association with transmission of message 3 in accordance with the random access procedure, wherein the reason varies based on the control channel resource set group.

17. The method of claim 14, wherein the different types of traffic are selected from a group comprising: enhanced mobile broadband traffic, ultra reliable and low latency traffic, and massive machine type communication traffic.

18. A non-transitory machine-readable storage medium, comprising executable instructions that, when executed by a processor of a device, facilitate performance of operations, comprising:
  determining a control channel resource set group applicable to decoding downlink control information for a type of traffic to be communicated between the device and a network equipment of a wireless communication network using a radio link established between the device and the network equipment;
  determining a radio link monitoring protocol parameter used to monitor a quality of the radio link for determining a radio link failure based on the control channel resource set group, wherein the network equipment configures different control channel resource set groups for different types of traffic, and wherein different radio link monitoring protocol parameters are respectively defined for the different control channel resource set groups;
  monitoring the quality of the radio link using the radio link monitoring protocol parameter;
  deactivating the radio link in response to a determination that the radio link failure has occurred as determined based on the monitoring;
  determining time and frequency resources for a preamble transmission of a connection re-establishment procedure for re-establishing the radio link with the network equipment based on the control channel resource set group, wherein the time and frequency resources for the preamble transmission vary for the different control channel resource set groups; and
  performing, by the device, the connection re-establishment procedure using the time and frequency resources for the preamble transmission.

19. The non-transitory machine-readable storage medium of claim 18, wherein the different types of traffic are selected from a group comprising: enhanced mobile broadband traffic, ultra reliable and low latency traffic, and massive machine type communication traffic.

20. The non-transitory machine-readable storage medium of claim 18, wherein performing the connection re-establishment procedure further comprises sending information to the network equipment indicating a reason for the determination that the radio link failure occurred in association with transmission of message 3 in accordance with the connection re-establishment procedure, and wherein the reason varies based on the control channel resource set group.

* * * * *